(12) United States Patent
Hashimoto et al.

(10) Patent No.: US 11,418,710 B2
(45) Date of Patent: Aug. 16, 2022

(54) COMPOSITE RECEPTION/EMISSION APPARATUS

(71) Applicant: MAXELL, LTD., Kyoto (JP)

(72) Inventors: Yasunobu Hashimoto, Kyoto (JP); Hiroaki Ono, Kyoto (JP); Osamu Kawamae, Kyoto (JP); Nobuo Masuoka, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/428,647

(22) PCT Filed: Feb. 7, 2019

(86) PCT No.: PCT/JP2019/004493
§ 371 (c)(1),
(2) Date: Aug. 5, 2021

(87) PCT Pub. No.: WO2020/161871
PCT Pub. Date: Aug. 13, 2020

(65) Prior Publication Data
US 2022/0132032 A1    Apr. 28, 2022

(51) Int. Cl.
*H04N 5/247* (2006.01)
*G01S 17/89* (2020.01)
*G01S 17/86* (2020.01)
*H04N 5/232* (2006.01)

(52) U.S. Cl.
CPC ......... *H04N 5/23238* (2013.01); *H04N 5/247* (2013.01); *G01S 17/86* (2020.01); *G01S 17/89* (2013.01)

(58) Field of Classification Search
CPC .... H04N 5/23238; H04N 5/247; G01S 17/86; G01S 17/89
See application file for complete search history.

(56) References Cited

U.S. PATENT DOCUMENTS

| | | | |
|---|---|---|---|
| 10,263,432 B1 * | 4/2019 | Leabman | H02J 50/20 |
| 2003/0030636 A1 | 2/2003 | Yamaoka | |
| 2017/0118458 A1 | 4/2017 | Grönholm et al. | |
| 2020/0160737 A1 * | 5/2020 | Knusel | G09B 1/38 |

FOREIGN PATENT DOCUMENTS

| | | |
|---|---|---|
| JP | 2001-204015 A | 7/2001 |
| JP | 2001-285894 A | 10/2001 |
| JP | 2017-518663 A | 7/2017 |
| JP | 2018142963 A | 9/2018 |
| WO | WO-2014200589 A2 * | 12/2014 ........... G01S 17/003 |

OTHER PUBLICATIONS

International Search Report of PCT/JP2019/004493 dated Mar. 12, 2019.

* cited by examiner

*Primary Examiner* — Thai Q Tran
*Assistant Examiner* — Jose M Mesa
(74) *Attorney, Agent, or Firm* — Mattingly & Malur, PC

(57) ABSTRACT

A composite reception and emission apparatus comprises: a plurality of first-type devices that receives or emits energy; a plurality of second-type devices whose type is different from a type of the first-type devices; and a base body. The first-type devices and the second-type devices measure a full solid angle, and are arranged on the base body such that a device closest to each of the first-type devices in an orientation space is at least one of the second-type devices, and a device closest to each of the second-type devices in the orientation space is at least one of the first-type devices.

11 Claims, 19 Drawing Sheets

NUMBER OF DEVICES : SIX

NUMBER OF DEVICES : EIGHT

NUMBER OF DEVICES : TWELVE

FIG. 6

ORIENTATION GROUP OF REGULAR TETRAHEDRON

| ORIENTATION GROUP | NUMBER OF ORIENTATIONS | REQUIRED RECEPTION AND EMISSION ANGLE RANGE |
|---|---|---|
| FACE CENTER ORIENTATION | 4 | 141.1 |
| VERTEX ORIENTATION | 4 | 141.1 |
| EDGE CENTER ORIENTATION | 6 | 109.5 |

ORIENTATION GROUP OF CUBE

| ORIENTATION GROUP | NUMBER OF ORIENTATIONS | REQUIRED RECEPTION AND EMISSION ANGLE RANGE |
|---|---|---|
| FACE CENTER ORIENTATION | 6 | 109.5 |
| VERTEX ORIENTATION | 8 | 109.5 |
| EDGE CENTER ORIENTATION | 12 | 90.0 |

ORIENTATION GROUP OF REGULAR OCTAHEDRON

| ORIENTATION GROUP | NUMBER OF ORIENTATIONS | REQUIRED RECEPTION AND EMISSION ANGLE RANGE |
|---|---|---|
| FACE CENTER ORIENTATION | 8 | 109.5 |
| VERTEX ORIENTATION | 6 | 109.5 |
| EDGE CENTER ORIENTATION | 12 | 90.0 |

ORIENTATION GROUP OF CUBIC OCTAHEDRON

| ORIENTATION GROUP | NUMBER OF ORIENTATIONS | REQUIRED RECEPTION AND EMISSION ANGLE RANGE |
|---|---|---|
| FACE CENTER ORIENTATION (EQUILATERAL TRIANGLE) | 8 | 109.5 |
| FACE CENTER ORIENTATION (SQUARE) | 6 | 109.5 |
| VERTEX ORIENTATION | 12 | 90.0 |
| EDGE CENTER ORIENTATION | 24 | 70.5 |

IMAGING DATA RANGE OF IMAGING DEVICE 11-1

RANGING DATA RANGE OF RANGING SENSOR 12-1

RANGING DATA RANGE OF RANGING SENSOR 12-2

SYNTHESIZES RANGING DATA (BEFORE CORRECTION)

RANGING RANGE A    RANGING RANGE B

SYNTHESIZES RANGING DATA (AFTER CORRECTION)

RANGING RANGE A    RANGING RANGE B

COMPOSITE RECEPTION/EMISSION APPARATUS

TECHNICAL FIELD

The present invention relates to a composite reception and emission apparatus, and more particularly, to a technique for arranging devices of a plurality of types on a single base body.

BACKGROUND ART

In recent years, a portable information terminal apparatus such as a cell phone and a smartphone has been miniaturized while being provided with various additional functions for differentiation among them. Especially, a camera function has been enhanced so that a wide range of images and videos can be captured by a wide-angle lens mounted thereon. For example, Patent Literature 1 discloses, "The surrounding camera is configured by mounting each one camera on each face of a polyhedron such as a regular dodecahedron and a picked-up image over the entire circumference can be obtained by each camera. By sequentially connecting the images picked up by the adjacent cameras, one full circumferential image can be obtained. However, the surrounding cameras cannot be assembled in a way that projection centers of the cameras can completely be in matching each other. Then in the case of jointing the picked-up images, adjusting dynamically the jointed positions of the adjacent picked-up images depending on far and near of the object can eliminate missing and conspicuous joints around the borders between the images so as to generate a seamless surrounding scenery" (excerpted from Abstract).

CITATION LIST

Patent Literature

Patent Literature 1: JP-A-2001-204015

SUMMARY OF INVENTION

Technical Problem

In the ranging method according to Patent Literature 1, a distance to a subject is assumed, the jointed portions between the captured images are dynamically adjusted, and a distance when the jointed portions are smoothly connected is determined as an estimated distance to the subject. Since the ranging method according to Patent Literature 1 is an indirect method as described above, the accuracy of the obtained distance is not sufficient. Accordingly, in addition to the imaging function, it is desirable to separately provide a ranging function for directly measuring the distance to the subject. Since a frame used in the surrounding camera of Patent Literature 1 is connected via a wire and fixedly used, a relatively large-sized frame can be used therefor. In this case, it is possible to increase each angle of view of each imaging device so as to overlap their imaging ranges with each other, thereby implementing the ranging function by a stereo method. However, in the case of mounting the ranging function and imaging function for a full solid angle on a miniaturized apparatus such as the portable information terminal, since the base length is shortened as a result in which the ranging function is implemented by the stereo method using the imaging device, there is a problem that the accuracy of ranging is not improved. Therefore, applying the surrounding camera technique disclosed in Patent Literature 1 to a small apparatus without any modification does not solve the problem.

The present invention has been made to solve the problems above, and an object thereof is to provide a composite reception and emission apparatus in which devices of a plurality of types are efficiently arranged on a single base body.

Solution to Problem

In order to solve the problems above, the present invention includes the technical features described in the scope of claims. As one aspect of the present invention, it is provided a composite reception and emission apparatus, comprising: a plurality of first-type devices that receives or emits energy; a plurality of second-type devices that receives or emits energy, whose type is a different from a type of the first-type devices; and a base body on which the plurality of first-type devices and the plurality of second-type devices are mounted, when a reception direction or an emission direction of each of the plurality of first-type devices is combined with each other for each of the plurality of first-type devices, each of the plurality of first-type devices receiving the energy from an area of a full solid angle or emitting the energy toward the area of the full solid angle, when a reception direction or an emission direction of each of the plurality of second-type devices is combined with each other for each of the plurality of second-type devices, each of the plurality of second-type devices receiving the energy from the area of the full solid angle or emitting the energy toward the area of the full solid angle, and the plurality of first-type devices and the plurality of second-type devices being arranged on the base body so as to satisfy both of two constraint conditions below:

Constraint condition 1: A device closest to each of the plurality of first-type devices in an orientation space is at least one of the second-type devices; and Constraint condition 2: A device closest to each of the plurality of second-type devices in the orientation space is at least one of the first-type devices.

Advantageous Effects of Invention

According to the present invention, it is possible to provide a composite reception and emission apparatus in which devices of a plurality of types are efficiently arranged on a single base body. The problems, configurations, and effects other than those described above will be clarified by explanation of the embodiments below.

BRIEF DESCRIPTION OF DRAWINGS

FIG. 6 illustrates the number of orientations and a required reception and emission angle range for each orientation group included in a regular tetrahedron, a regular octahedron, and a cubic octahedron.

DESCRIPTION OF EMBODIMENTS

Figure 1:
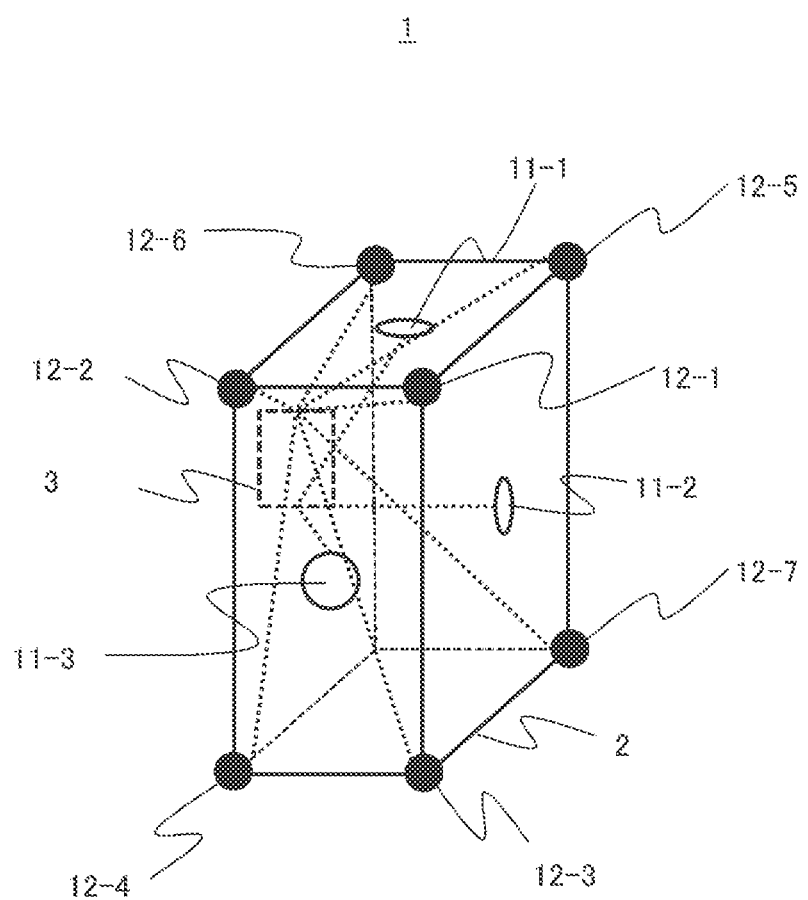
FIG. 1 illustrates an appearance of a composite reception and emission apparatus 1 according to a first embodiment.

Hereinafter, embodiments of the present invention will be described with reference to the drawings. Throughout the drawings, the same components are provided with the same reference signs, and repetitive explanation therefor will be omitted. In the following, as a combination of devices of different types, an example of a combination of an imaging device (corresponding to a first-type device) and a ranging sensor (corresponding to a second-type device) will be described, meanwhile, the present invention is not limited thereto.

First Embodiment

In the first embodiment, in addition to a base body 2 on which devices are mounted (see FIG. 1), an orientation defining polyhedron 5 (see FIG. 3A) which defines the center orientation of each of the first-type device and the second-type device (orientation for directing the center direction of a reception and emission range). Here, the "orientation" means a direction in the real space to which the center direction of the reception and emission range is to be directed. Furthermore, an "orientation space" is a space defined as a set of orientations in the real space. For example, the orientation in the real space is expressed by a deflection angle ($\theta$, $\varphi$) of a polar coordinate system (r, $\theta$, $\varphi$). It is assumed that vectors in the real space in which one of them moves in parallel and overlaps on the other one of them have the same orientations. The "base body 2" is an object that actually exists in the real space, on which the first-type device and the second-type device are mounted. On the other hand, the "orientation defining polyhedron 5" is a conceptual form which is introduced to determine the center orientation of each of the first-type device and the second-type device mounted on the base body 2, and therefore, the "orientation defining polyhedron 5" is not an actual object. The "orientation defining polyhedron 5" defines, in the "orientation space", an orientation group including a plurality of orientations having good symmetries based on its geometric symmetrical property.

The orientation group is, for example, a group of orientations directed from the center position of the "orientation defining polyhedron 5" toward the centers of faces thereof having the same shapes (which will be described later in detail). The "orientation defining polyhedron 5" is the shape having symmetries of at least two or more orientations of a first symmetry and a second symmetry. Each of the first-type devices corresponding to each of a plurality of orientations having the first symmetry included in the orientation defining polyhedron 5 is arranged on the base body 2 with each corresponding orientation being set as the center orientation of each device. Furthermore, each of the second-type devices corresponding to each of a plurality of orientations having the second symmetry included in the orientation defining polyhedron 5 is arranged on the base body 2 with each corresponding orientation being set as the center orientation of each device. Both the arrangement positions of the first-type devices and those of the second-type devices are adjusted so that the base body 2 is not included in a reception and emission range of each device. Meanwhile, even if the base body 2 obstructs the reception and emission range, the obstruction is allowable when the reception and emission range of each device is sufficiently wide and a combination of the reception and emission ranges of the devices of the respective types covers a full solid angle.

Furthermore, if the obstructed orientation is an orientation which does not require any reception and emission, the obstruction in the reception and emission range of a part of the devices relating to the orientation above is also allowable. An arrangement with less obstruction by the base body 2 is realized when the shape of the base body 2 is the same as the shape of the orientation defining polyhedron 5 or when an arrangement orientation of each device as viewed from the center of the base body 2 is close to the center orientation of each device. In the latter arrangement, the center orientation direction of each device is, on average, close to the vertical direction of a surface of the base body 2. Furthermore, in this arrangement, since the center orientation of each first-type device and that of each second-type device are set to form a nesting structure in the orientation space, the arrangement positions thereof on the base body 2 also form the nesting structure, thereby improving the arrangement efficiency. In the case where the shape of the base body 2 is different from the shape of the orientation defining polyhedron 5, positions in which the arrangement orientations of the devices as viewed from the center of the base body 2 are the center orientations of devices are set as a basic arrangement. Then, considering the shape of the base body 2 and a limitation in mounting on the base body 2, the arrangement positions on the base body 2 are adjusted by moving them from the basic arrangement while maintaining each center position of each device. In this case, the arrangement efficiency of the devices is also good since the adjustment based on the basic arrangement is performed.

FIG. 1 illustrates an appearance of a composite reception and emission apparatus 1 according to the first embodiment. In the composite reception and emission apparatus 1, a body of a portable information terminal, such as a smartphone, is the base body 2, and each of the first-type devices 1, 2, ..., M (11-1, 11-2, ..., 11-M) is arranged on the base body 2 with the orientation satisfying the first symmetry included in the orientation defining polyhedron 5 being set as the center orientation. Furthermore, in the composite reception and emission apparatus 1, each of the second-type devices 1, 2, ..., N (12-1, 12-2, ..., 12-N) is arranged on the base body 2 with the orientation satisfying the second symmetry included in the orientation defining polyhedron 5 being set as the center orientation. An arrangement position of each device on the base body 2 is determined by considering a limitation in mounting on the base body 2. The orientation defining polyhedron 5, the first symmetry, and the second symmetry will be described later.

A controller 3 is provided inside the base body 2. The controller 3 is connected to each of the first-type devices 1, 2, ..., M (11-1, 11-2, ..., 11-M) and each of the second-type devices 1, 2, ..., N (12-1, 12-2, ..., 12-N). The controller 3 is configured by a computer including a processor and a circuit. Each of "M" indicating the number of the first-type devices and "N" indicating the number of the second-type devices is an integer of two or more. "M" and "N" may be the same number or different numbers. Here, the plurality of first-type devices 1, 2, ..., M (11-1, 11-2, ..., 11-M) is collectively referred to as a first-type device group 11, and the plurality of second-type devices 1, 2, ..., N (12-1, 12-2, ..., 12-N) is collectively referred to as a second-type device group 12.

Each of the first-type devices 1, 2, ..., M (11-1, 11-2, ..., 11-M) is an imaging device configured by using, for example, a wide-angle lens and a Charge-Coupled Device (CCD) sensor or a Complementary metal-oxide-semiconductor (CMOS) sensor. Each of the first-type devices 1, 2, ..., M (11-1, 11-2, ..., 11-M) is arranged on an appropriate position of the base body 2 in an appropriate orientation, thereby enabling imaging of the full solid angle.

Each of the second-type devices 1, 2, ..., N (12-1, 12-2, ..., 12-N) is a TOF sensor for measuring a distance to, for example, a person and an object. Each of the second-type devices 1, 2, ..., N (12-1, 12-2, ..., 12-N) is arranged on an appropriate position of the base body 2 in an appropriate orientation, thereby enabling measurement of a distance to a full solid angle object.

Figure 2:
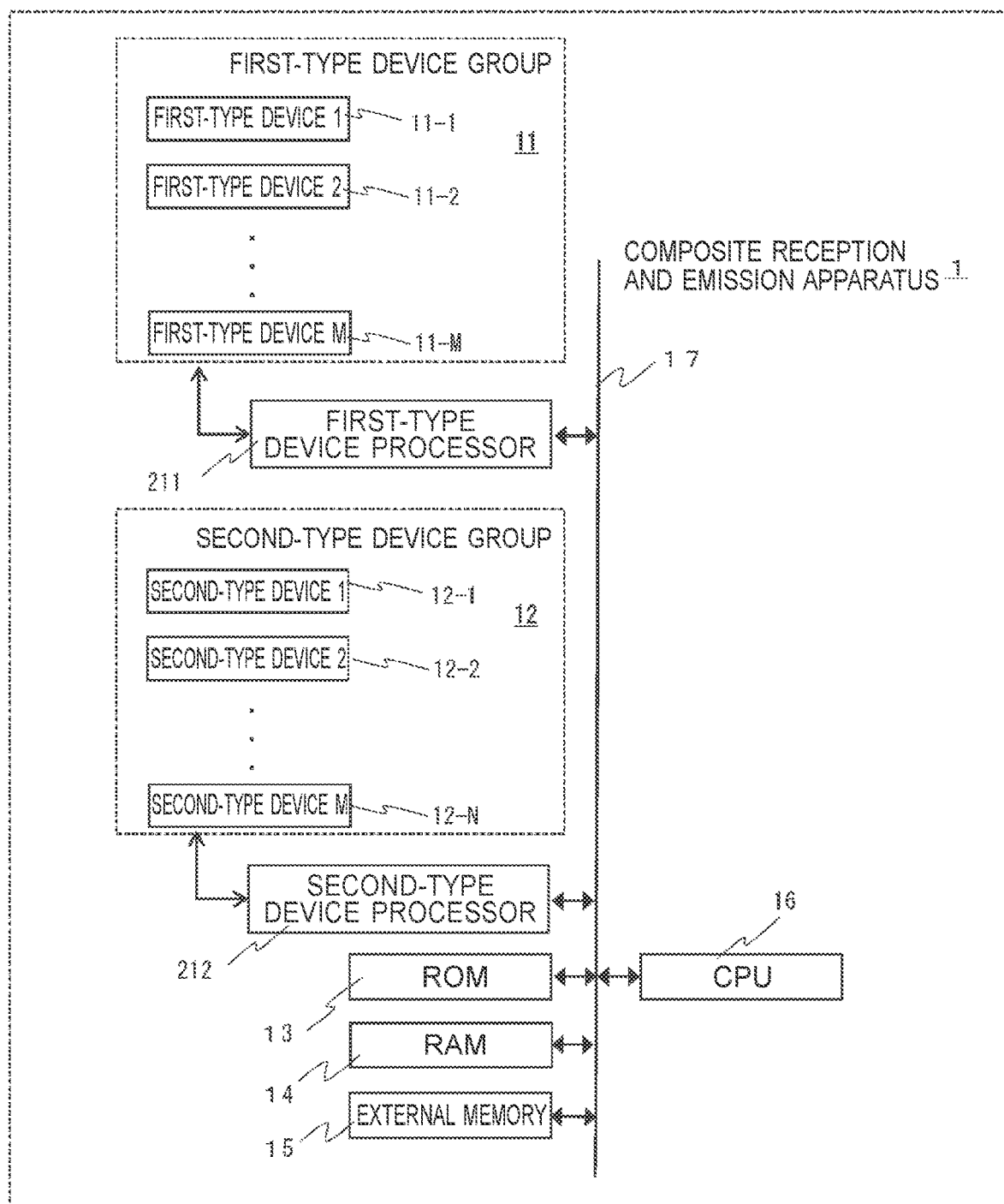
FIG. 2 is an overall block diagram of the composite reception and emission apparatus 1 according to the first embodiment.

FIG. 2 is an overall block diagram of the composite reception and emission apparatus 1 according to the first embodiment. The controller 3 of the composite reception and emission apparatus 1 includes a first-type device processor 211 configured to control the first-type device group 11, a second-type device processor 212 configured to control the second-type device group 12, a Central Processing Unit (CPU) 16, a Read Only Memory (ROM) 13 that holds programs and various setting values used to perform the processing of the CPU 16 and control of the first-type device group 11 and the second-type device group 12, a RAM 14 that temporarily stores imaging data output from the first-type device group 11 and ranging data output from the second-type device group 12 (hereinafter, the imaging data and the ranging data are collectively referred to as "measurement data") and provides work areas for the programs to be executed, an external memory 15 that stores the measurement data, the imaging data, and video and image data generated or captured in advance, and a system bus 17.

Figure 3A:
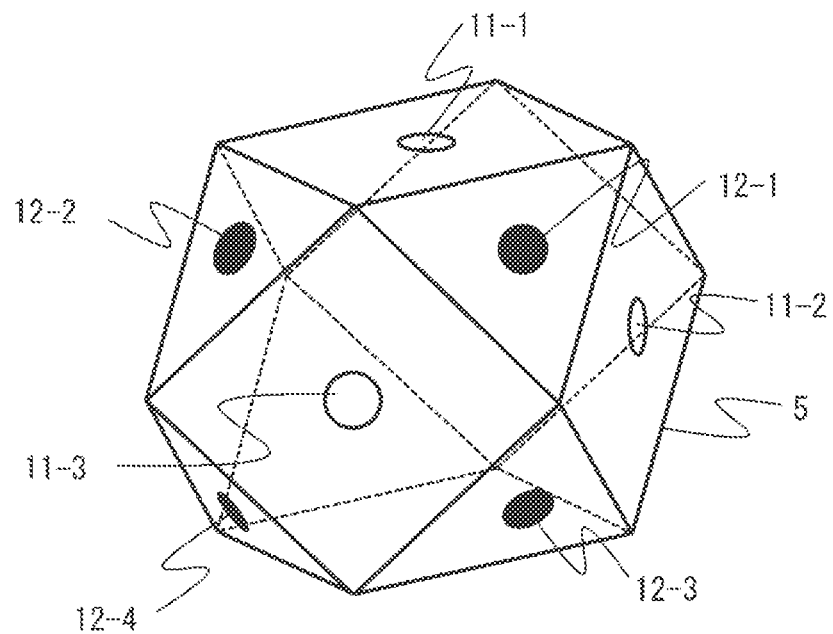
FIG. 3A illustrates an arrangement example of first-type devices and second-type devices according to the first embodiment.

FIG. 3A illustrates an arrangement example of the first-type devices 1, 2, ..., M (11-1, 11-2, ..., 11-M) and the second-type devices 1, 2, ..., N (12-1, 12-2, ..., 12-N) based on the orientation defining polyhedron 5, according to the first embodiment.

As the orientation defining polyhedron 5, a regular polyhedron, a semi-regular polyhedron, or a Catalan solid (a dual polyhedron of a semi-regular polyhedron) is used. In FIG. 3A, the shape of the orientation defining polyhedron 5 is a cubic octahedron.

Each of the first-type device group 11 and the second-type device group 12 is arranged by using the symmetries included in the orientation defining polyhedron 5. More specifically, by using the center of the orientation defining polyhedron 5 as a reference point, an orientation group including the orientations viewed from the center of the orientation defining polyhedron 5 toward the center of each face (which may be the center of gravity) is defined as the first symmetry, an orientation group including the orientations viewed from the center of the orientation defining polyhedron 5 toward the center of each edge is defined as the second symmetry, and an orientation group including the orientations viewed from the center of the orientation defining polyhedron 5 toward each vertex is defined as a third symmetry. Based on the orientations of each orientation group included in the orientation defining polyhedron 5 having good symmetries, which are set as the center orientations, the first-type devices 1, 2, ..., M (11-1, 11-2, ..., 11-M) and the second-type devices 1, 2, ..., N (12-1, 12-2, ..., 12-N) are arranged on the orientation defining polyhedron 5, and accordingly, the full solid angle can be covered efficiently by a nesting structure formed in the orientation space without interference of each device. For example, each of the first-type devices 1, 2, ..., M (11-1, 11-2, ..., 11-M) is arranged with a face center orientation (first symmetry) being set as the center orientation while each of the second-type devices 1, 2, ..., N (12-1, 12-2, ..., 12-N) is arranged with a vertex center orientation (third symmetry) being set as the center orientation. Since devices of different types can be arranged by the number of orientation groups, the number of device types may be three or more.

Furthermore, in the case of the imaging device using a super wide angle lens such as a fisheye lens, since a single imaging device may have an angle of view of more than 180 degrees, it is not necessary to use all the orientations in the orientation group to arrange devices. However, when such an imaging device is combined with different-type devices, the imaging device is arranged in a part of the orientation group that forms the nesting structure with the orientation group in which the different type devices are arranged. As a result, it is possible to realize an efficient device arrangement with good symmetries as a whole while reducing the interference therebetween. In this case, the nesting arrangement is formed in only the proximity of a small number of devices within the orientation space. In this situation, it can be expressed that in the nesting arrangement without deviation, considering mounting errors, a first proximity device and a second proximity device of the smaller number of devices are the different type devices.

The example illustrated in FIG. 3A is the arrangement example when the base body 2 has the same shape as that of the orientation defining polyhedron 5. In FIG. 3A, by using the orientation directed from the center of the cubic octahedron toward the square-shaped face center which is set as the center orientation, the six first-type devices 11-1, 11-2, 11-3 (FIG. 3A omits to illustrate the remaining three devices) are arranged on six positions, respectively. Each of the three remaining devices that is not illustrated in FIG. 3A is arranged on a square-shaped face positioned at the opposite invisible side.

Furthermore, by using the orientation directing from the center of the cubic octahedron toward the triangle-shaped face center which is set as the center orientation, the eight second-type devices 12-1, 12-2, 12-3, 12-4 (FIG. 3A omits to illustrate the remaining four devices) are arranged on eight positions, respectively. Each of the four remaining devices that is not illustrated in FIG. 3A is arranged on an equilateral triangle-shaped face positioned at the opposite invisible side.

An imagining range of each of the first-type devices 11-1, 11-2, 11-3 and a ranging range of each the second-type devices 12-1, 12-2, 12-3, 12-4 forms a reception and emission angle range of each device to cover the full solid angle. When viewed from one of the first-type devices, the proximity device which is the closest thereto in the orientation space is the second-type device, and when viewed from one of the second-type devices, the proximity device which is the closest thereto in the orientation space is the first-type device.

When each reception and emission angle range of the respective devices is greater than a minimum required value, the orientation on which each device is mounted needs not to exactly coincide with the symmetrical orientation included in the orientation defining polyhedron 5, and is provided with high tolerance in its range covering the full solid angle.

As the first-type devices, for example, a plurality of imaging devices to which a CCD or CMOS with a wide-angle lens is combined is arranged, which enables imaging of the full solid angle. As the ranging sensors as the second-type devices, for example, a plurality of Time of Flight (TOF) sensors is arranged, which enables ranging of the full solid angle. The TOF sensor is used to measure a distance to a subject by measuring, for each pixel, a temporal deviation until the light emitted from the imaging element side is reflected by the subject. In this way, when the TOF sensor is used with a two-dimensional arrayed sensor (CMOS or CCD), the distance to the subject can be recognized two-dimensionally.

In order to recognize the distance to the subject two-dimensionally, it is necessary to arrange the TOF sensor on the base body 2 two-dimensionally. Even in the case of mounting a wide-angle lens, its angle of view is about 120 to 140 degrees. On the other hand, since the size of the pixel is about 10 µm, the size of the sensor itself can be suppressed to several millimeters square, thereby making it possible to mount a plurality of sensors on the base body 2. In this way, when the number of TOF sensors and their arrangement positions and angles are appropriately adjusted, it is easy to perform ranging of the full solid angle.

As long as the orientations to which the devices are directed are the same as each other, the devices are not necessarily arranged on specific positions (the face center position, the edge center position, and the vertex position) of the base body 2 (in this case, corresponding to the orientation defining polyhedron 5).

Figure 3B:
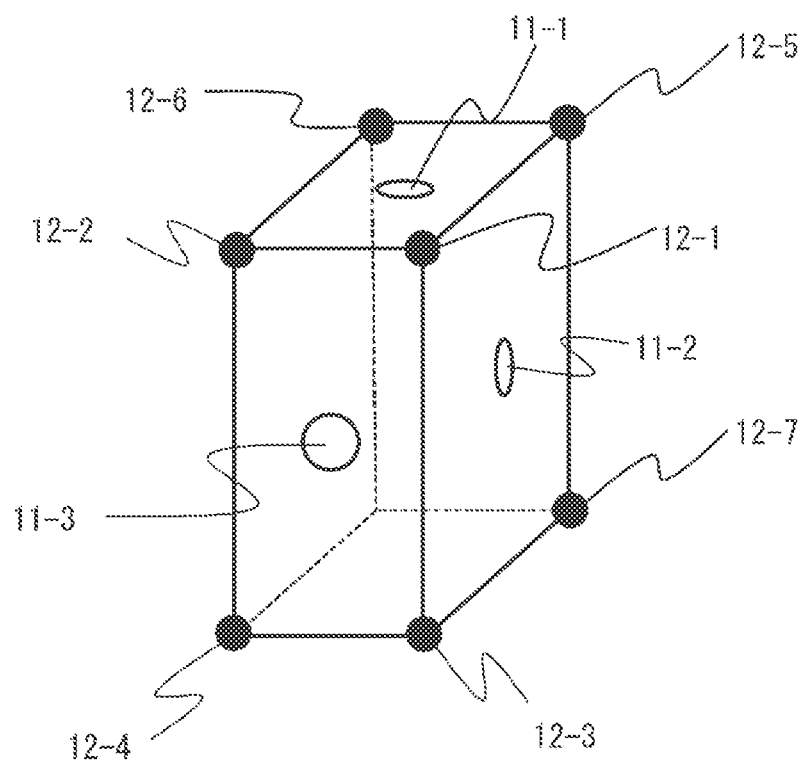
FIG. 3B illustrates an arrangement example of the first-type devices and the second-type devices according to the first embodiment.

Furthermore, the shape of the base body 2 may be different from the shape of the orientation defining polyhedron 5. In this case, the orientation to which each device is directed is an orientation of the orientation group included in the orientation defining polyhedron 5. For example, in FIG. 3A, when a rectangular parallelepiped is employed as the base body 2 without changing the orientations to which the imaging devices and the ranging sensors are directed in the cubic octahedron, the imaging devices and the ranging sensors may be arranged on the face center positions and the vertex positions of the rectangular parallelepiped, respectively. FIG. 3B illustrates an arrangement example on the rectangular parallelepiped above.

In FIG. 3B, each of the imaging devices as the first-type devices is arranged on each face of the rectangular parallelepiped while each of the ranging sensors as the second-type devices is arranged on each vertex of the rectangular parallelepiped. In this case, the orientation to which each of the imaging devices is directed is the same as the orientation directed from the center of the rectangular parallelepiped toward the center of each face. On the other hand, the orientation to which each of the ranging sensors is directed is different from the orientation directed from the center of the rectangular parallelepiped toward each vertex, but the same as the orientation to which each equilateral triangle-shaped face of the cubic octahedron in FIG. 3A is directed. Since the shape of the base body 2 is the same as the shape of a smartphone or tablet terminal (rectangular parallelepiped), the example illustrated in FIG. 3B can be actually used as the portable composite reception and emission apparatus 1. Here, the above-described "orientation to which each of the imaging devices is directed" is the orientation of the center line of an angle of view of each imaging device, and the "orientation to which each of the ranging sensors is directed" is the orientation of the center line of a scanning range of each ranging sensor.

Figure 4A:
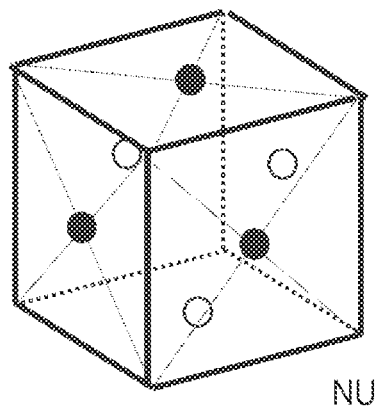
FIG. 4A illustrates an arrangement of devices by using an orientation group of face center (center of gravity) directions as viewed from the center of a cube.
Figure 4B:
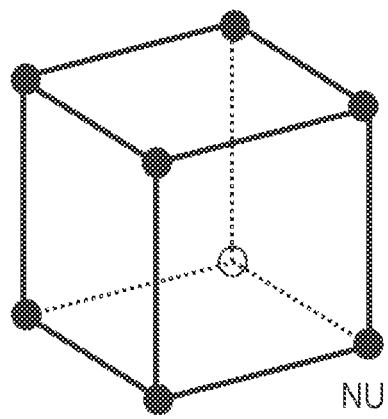
FIG. 4B illustrates an arrangement of devices by using an orientation group of vertex directions.
Figure 4C:
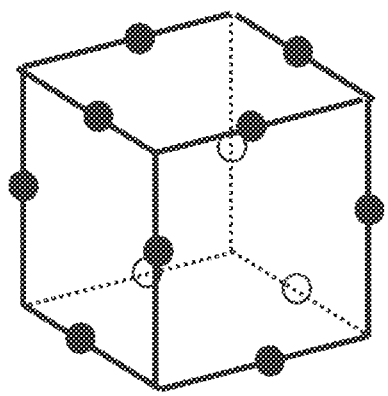
FIG. 4C illustrates an arrangement of devices by using an orientation group of edge center orientations.

FIG. 4A, FIG. 4B, and FIG. 4C illustrate an example in which each of the devices described above is arranged by using each symmetry included in a regular polyhedron, a semi-regular polyhedron, and a Catalan solid, respectively. Each example in FIG. 4A, FIG. 4B, and FIG. 4C corresponds to the case where the shape of the base body 2 is the same as the shape of the orientation defining polyhedron 5. FIG. 4A illustrates an arrangement of the devices by using the orientation group of the face center directions (center of gravity) as viewed from the center of the cube. FIG. 4B illustrates an arrangement of the devices by using the orientation group of the vertex directions. FIG. 4C illustrates an arrangement of the devices by using the orientation group of the edge center orientations.

Even on the same cubes, the number of devices to be mounted differs depending on each orientation group. Which orientation group to be used may be determined based on a reception and emission angle of each device to be mounted. The details thereof will be described below.

With reference to FIG. 5 and FIG. 6, a reception and emission angle of each device, which is required to enable the ranging and photographing of the full solid angle to be performed by a combination of the devices mounted thereon, will be described.

Figure 5A:
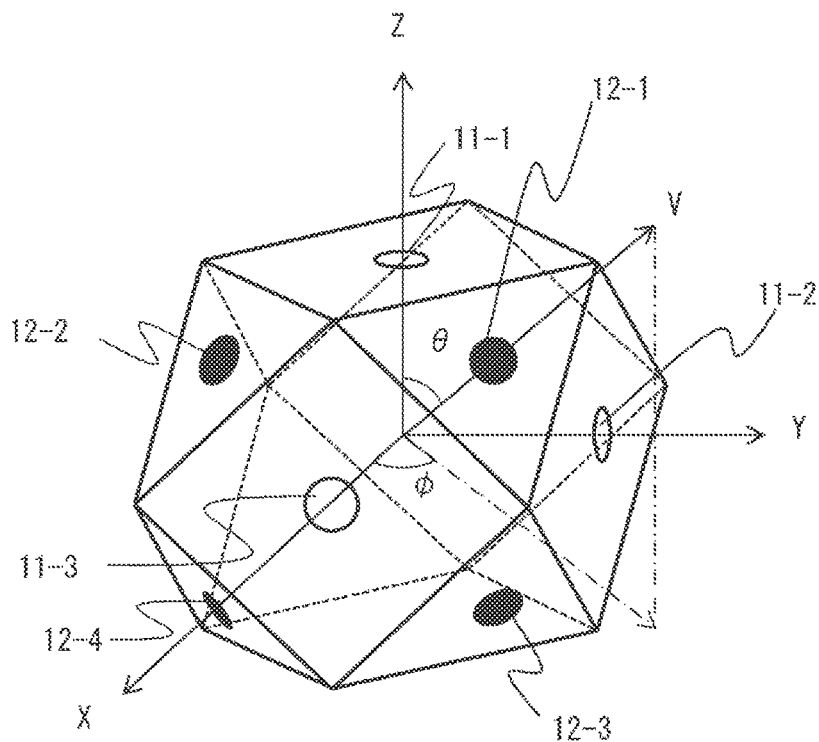
FIG. 5A illustrates an arrangement in which first-type devices are arranged on square-shaped faces of a cubic octahedron, and second-type devices are arranged on equilateral triangle shaped faces thereof.

In FIG. 5A, each of the first-type devices (11-1), (11-2), (11-3) is arranged on a square-shaped face of a cubic octahedron (back side of the cubic octahedron is not illustrated), and each of the second-type devices (12-1), (12-2), (12-3), (12-4) is arranged on an equilateral triangle shaped face thereof (back side of the cubic octahedron is not illustrated). This example also corresponds to the case where the shape of the base body 2 is the same as that of the orientation defining polyhedron 5. In order to cover the full solid angle (to measure the full solid angle) by the first-type devices mounted on the square-shaped faces, the reception and emission angle range may cover an orientation range within a pyramid formed by orientation vectors of a sub-group closest thereto within the group of the first-type devices. That is, the orientation range (serving as a unit of a measurement range of the first-type device) of a triangular pyramid formed by X-axis, Y-axis, and Z-axis illustrated in FIG. 5A needs to be covered with margins (area overlapping with the reception and emission angle range of an adjacent first-type device) by the reception and emission angle range of the first-type device.

Figure 5B:
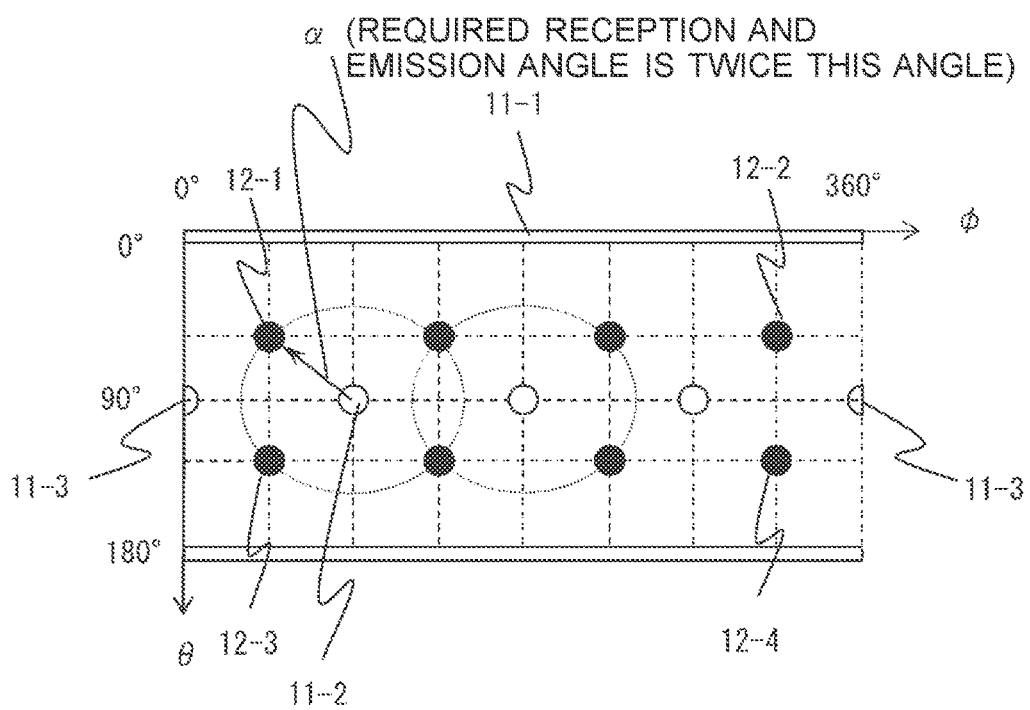
FIG. 5B illustrates each orientation to which each of all devices is directed by using a polar coordinate system.

FIG. 5B illustrates each orientation to which each of all devices is directed by using a deflection angle in a polar coordinate system. Since the first-type device (11-1) is directed to the orientation of θ=0 degree, the circle illustrated in FIG. 5A is expressed by a strip shape in FIG. 5B. When the required reception and emission angle range is expressed in FIG. 5B, the reception and emission angle range of one of the first-type devices (for example, the first-type device 11-2) may cover the central axis direction of the pyramid vertex angle, and the "central axis direction" is the direction of the second-type device (12-1) in FIG. 5A. That is, the "central axis direction" is the V-direction illustrated in FIG. 5A, and is the value of α illustrated in FIG. 5B. That is, the required reception and emission angle range is twice the angle α formed by the central axis direction of the pyramid vertex angle and the direction of the first-type device.

In FIG. 5B, the required reception and emission angle range is indicated by a broken line around the first-type device 11-2. In this case, since the angle α is 54.7°, the required reception and emission angle is 109.5° which is twice the angle α. Based on this example, FIG. 6 illustrates the number of orientations (may be the number of devices to be mounted) and a required reception and emission angle range for each orientation group included in a regular tetrahedron, cube, regular octahedron, and cubic octahedron. Here, as illustrated in the case of the face center orientation group of the cubic octahedron, the orientation group may be further divided in details depending on the types of the face, edge, and vertex. The above is merely an example, and in the case of other polyhedrons, the required reception and emission angle range can be obtained by the same approach. In the above, the required reception and emission angle range of each of the first-type devices has been described, meanwhile, the required reception and emission angle range of each of the second-type devices can be determined by the same approach.

In the case of the above-described required reception and emission angle, when TOF sensors are used as the ranging sensors, measurement ranges of the adjacent TOF sensors overlap with each other therebetween. With this regard, when the data of each sensor is complemented with each other, it is possible to achieve the measurement with high accuracy.

That is, in the case of a TOF sensor, since the measurement accuracy of its data closer to the center of the angle of view is higher than that of the peripheral portion of the angle of view. Accordingly, by comparing each piece of data of the adjacent TOF sensors and using the ranging data which is closer to the center portion of the angle of view, it is possible to achieve the ranging of the full solid angle with high accuracy. Each required reception and emission angle illustrated in FIG. 6 indicates an angle of view required for the TOF sensor when arranging each TOF sensor in each orientation group of the polyhedron. For example, in the case of arranging each TOF sensor on each vertex of a regular hexahedron, the number of devices to be arranged is eight, and the angle of view of each TOF sensor required to perform ranging of the full solid angle is 109.5 degrees. Similarly, in the case of arranging each TOF sensor on each vertex of a cubic octahedron, the number of sensors to be arranged is twelve, and the required angle of view thereof is 90 degrees. Accordingly, in this case, even TOF sensors with small angles of view can perform ranging of the full solid angle. In the case where the angles of view overlap with each other between the adjacent same type of devices, as described above, measurement data and images with high accuracy can be obtained by complementing the measurement data of the adjacent devices. In the above, the example of the TOF sensors as the ranging sensors has been described. Meanwhile, similarly, when pieces of the imaging data of adjacent imaging devices overlap with each other, since an image closer to the center of the angle of view has less distortion, it is preferable to select the image closer to the center of the angle of view. As described above, the reception and emission angle range of a device is an important factor in determining the number of devices to be mounted.

FIG. 6 illustrates a table in which the orientation group, the number of orientations included therein, and required reception and emission angle ranges are summarized for each various polyhedron. Although FIG. 6 illustrates the cases of a regular tetrahedron, cube, regular octahedron, and cubic octahedron as examples of polyhedrons, the present invention is not limited thereto. The required reception and emission angle ranges for various polyhedrons such as other regular polyhedrons, semi-regular polyhedrons, and Catalan solids can be determined by the approach described above, and the number of devices to be mounted thereon can also be determined by this approach.

That is, the present embodiment relates to a combination of full solid angle ranging performed by the ranging sensors, each of which measurement range is a small full solid angle, and full solid angle imaging performed by the cameras. In order to efficiently cover the full solid angle, in the present embodiment, a combination of orientations having good symmetries are selected for both the ranging system and the imaging system. With this regard, the symmetries included in a regular polyhedron, a semi-regular polyhedron, and a Catalan solid which serve as the orientation defining polyhedron 5 are used. Specifically, based on the orientation groups of the face center orientations (center of gravity), edge center orientations, and vertex orientations in each of the regular polyhedron, a semi-regular polyhedron, and a Catalan solid as viewed from each center thereof, the ranging sensors and the imaging devices are arranged in the orientations of the orientation groups included in each of the various regular polyhedrons (or semi-regular polyhedrons or Catalan polyhedrons). As a result, it is possible to efficiently cover the full solid angle by the nesting form without interference therebetween.

In this connection, the imaging devices each having a wide-angle lens whose angle of view is more than 180 degrees enable imaging of the full solid angle when each of them is arranged in two opposite directions, respectively. In this case, it is not necessary to arrange the devices in all the orientations of the orientation group. However, also in this case, when the different type devices are combined thereto, each of the imaging devices is arranged on a part of the orientation group which forms the nesting structure with the orientation group in which each of the different type devices is arranged. As a result, it is possible to achieve an efficient device arrangement with good symmetries as a whole while reducing interference between the devices of different types.

As will be described later as a modification, the axis passing through the center of each device does not need to be gathered in one point as long as the orientation thereof is not changed. According to this modification, the degree of flexibility in arrangement is increased. Furthermore, as also will be described as another modification, in the case where the reception and emission angles for covering differ in the vertical and horizontal directions of the device, the arrangement efficiency may be improved when the face center orientations of a rhombic polyhedron are used.

Next, with regard to the above-described arrangement positions of the imaging devices and ranging sensors, an example of a specific arrangement method will be described with reference to FIG. 7A and FIG. 7B. The following explanation is an example, and thus the arrangement example is not limited thereto.

Figure 7A:
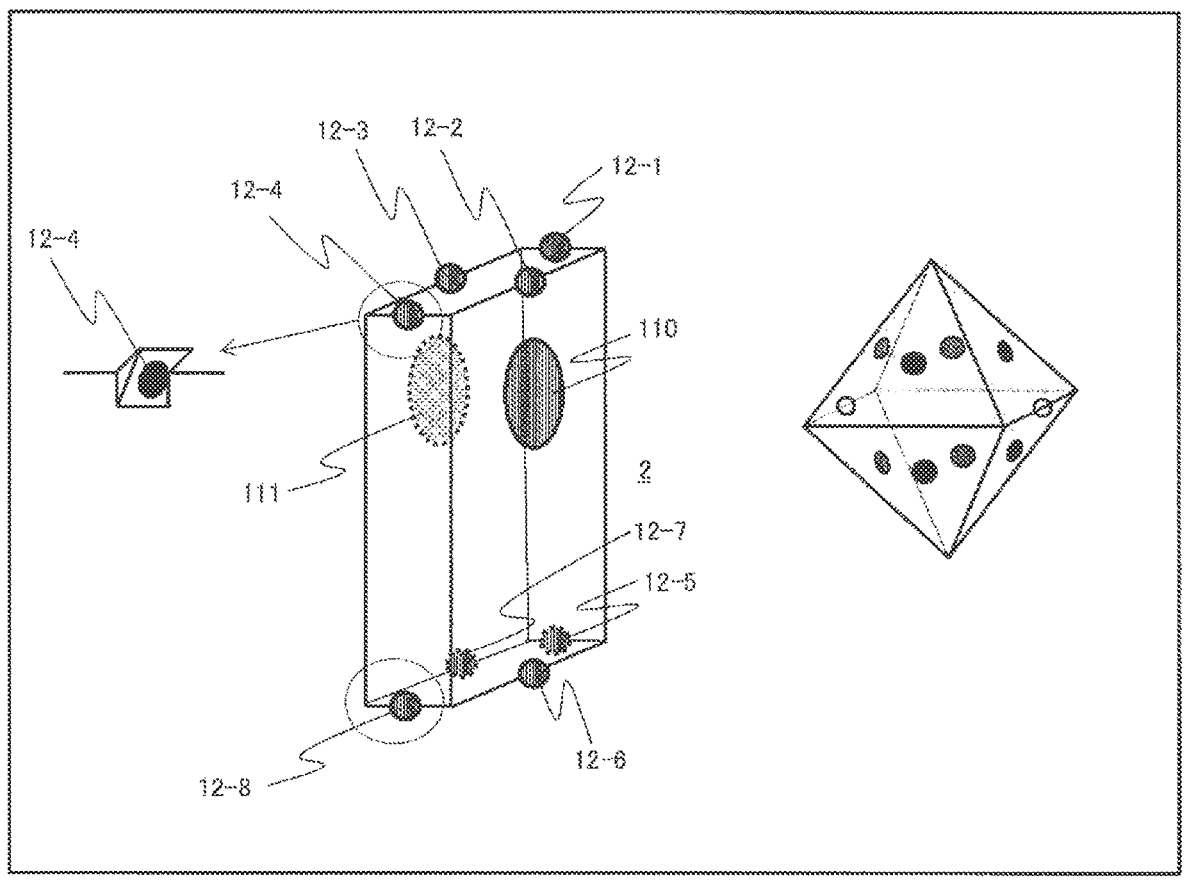
FIG. 7A illustrates an example in which a composite reception and emission apparatus is mounted on a portable information terminal having a rectangular parallelepiped (hexahedron) shape.

FIG. 7A illustrates an example in which the composite reception and emission apparatus 1 is mounted on a portable information terminal having an approximately rectangular parallelepiped (hexahedron) shape. The approximate rectangular parallelepiped is the base body 2. For example, by setting a regular octahedron as the orientation defining polyhedron 5 and using the orientation group thereof, the ranging sensors and the imaging devices are arranged thereon. When the orientation group of the face center orientations is used as the center orientation of each ranging sensor, it is necessary to arrange eight sets of the ranging sensors. However, since the portable information terminal is a hexahedron, it is impossible to mount each one of the eight ranging sensors on each face of the hexahedron. To solve this problem, for example as illustrated in FIG. 7A, four sets of the eight sensors are arranged on the edge portions of the top face and other four sets of the eight sensors are arranged on the edge portions of the bottom face while being directed to the orientations of the face center orientation group of the regular octahedron.

When each ranging sensor is arranged on each edge of the portable information terminal, it may be mounted on a groove formed (or provided by chamfering) on each edge. In this case, it is sufficient that the angle of view of each ranging sensor is equal to or more than 109.5 degrees which are the value for the face center orientations of the orientation group of the regular octahedron illustrated in FIG. 6. In the above, the example of the method of arranging each ranging sensor by forming a groove on each edge of the portable information terminal has been described. Meanwhile, the arrangement method is not limited thereto as long as the center orientation of each ranging sensor is directed in the orientation described above.

On the other hand, the imaging devices 110, 111 are arranged in the directions of the edge center orientation group of the regular octahedron. Here, it is assumed that the angle of view of each imaging device is equal to or more than 180 degrees. In this case, two orientations facing each other are selected from the edge center orientation group, and each device is mounted on each of the two faces on the symmetrical positions of the hexahedron of the portable information terminal. As a result, it is possible to perform imaging of the full solid angle.

Figure 7B:
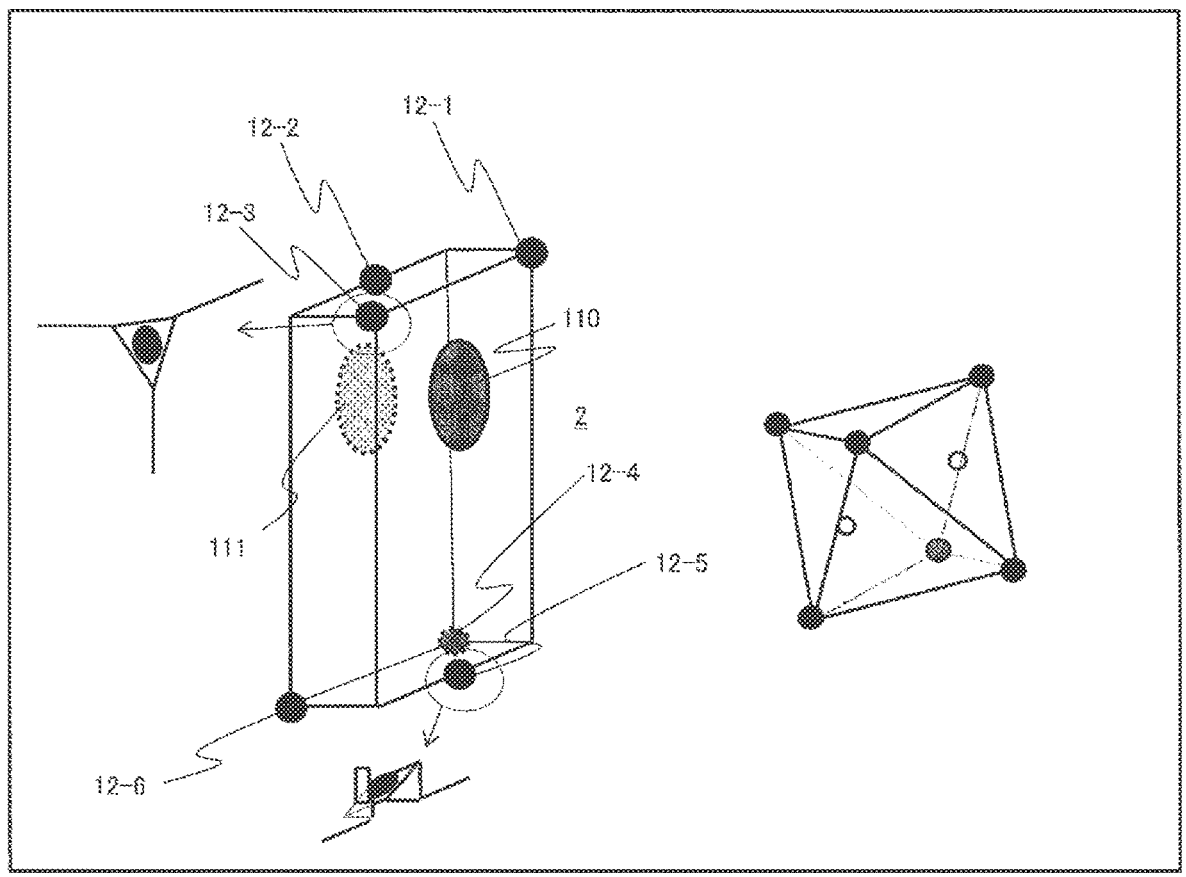
FIG. 7B illustrates an arrangement in which each ranging sensor is arranged in each orientation of a vertex orientation group of a regular octahedron.

FIG. 7B illustrates an example of arrangement of each ranging sensor, in which each orientation of the vertex orientation group of a regular octahedron serving as the orientation defining polyhedrons 5 is used as the center orientation. In this case, three sets of the ranging sensors are arranged on the top face and other three sets of the ranging sensors are arranged on the bottom face. More specifically, each vertex of the portable information terminal is cut off obliquely, and each ranging sensor is mounted thereon to be directed in the orientation of the above-mentioned orientation group. Also in this case, it is sufficient that the angle of view of each ranging sensor is equal to or more than 109.5 degrees.

On the other hand, the imaging devices 110, 111 are arranged by using the orientations of the face center orientation group of a regular octahedron as the center orientations. Here, it is assumed that the angle of view of each imaging device is equal to or more than 180 degrees. In this case, two orientations facing each other are selected from the face center orientation group, and each device is mounted on each of the two faces on the symmetrical positions of the hexahedron of the portable information terminal. As a result, it is possible to perform imaging of the full solid angle. In this example, although all orientations of the face center orientation group are not provided with the imaging sensors, the device closest to each of the all ranging sensors in the orientation space is an imaging device.

As described above, since the orientations of the orientation group included in a regular polyhedron, a semi-regular polyhedron, and a Catalan solid which serve as the orientation defining polyhedron 5 are used as the center orientations, it is possible to efficiently arrange the imaging devices and the ranging sensors on the base body 2, and perform ranging and imaging of the full solid angle.

In this connection, considering a case of taking images at night or in a dark place, there may be a demand of an illumination device for a full solid angle. In this regard, a plurality of illumination devices may be mounted by the same approach as described above. The devices are arranged such that the center orientation of each imaging device and the center orientation of each illumination device form a nesting structure in the orientation space, thereby making it possible to prevent the imaging devices from being directly interfered by the illumination devices.

Figure 8:
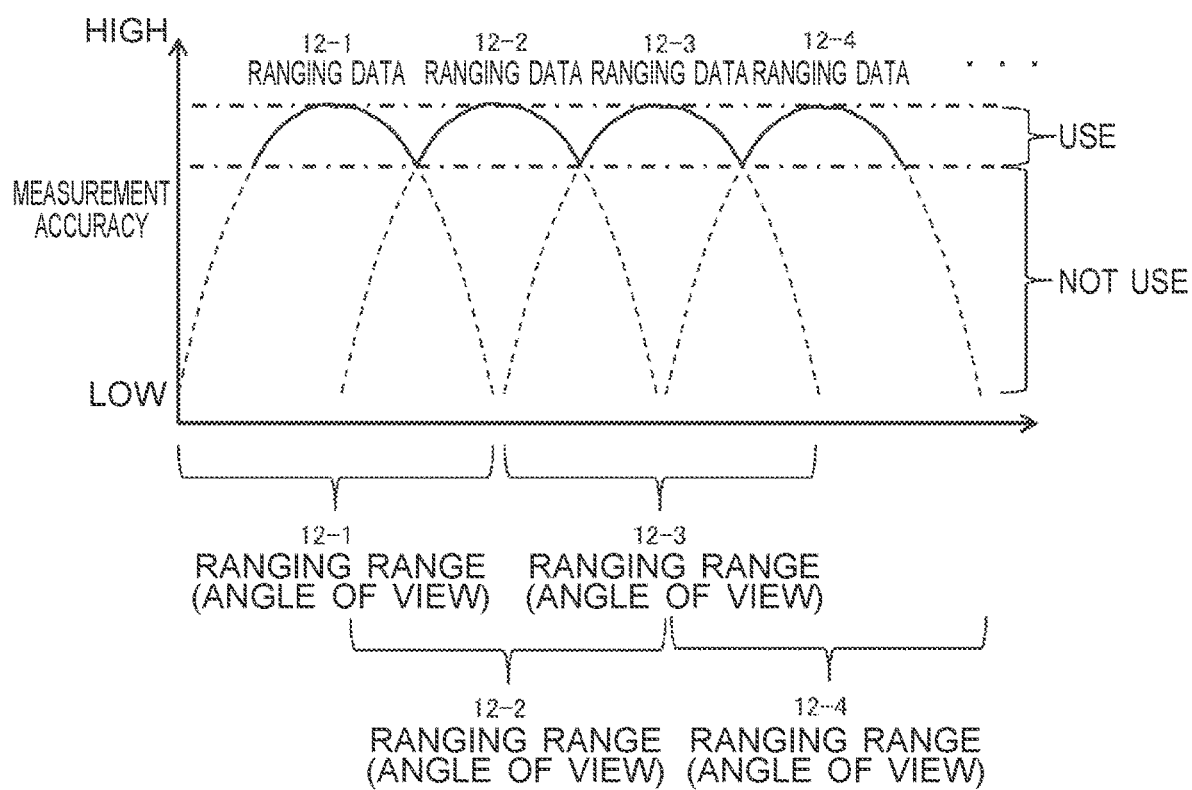
FIG. 8 illustrates ranging data measured by the four ranging sensors illustrated in FIG. 5A, respectively.

FIG. 8 illustrates an example in which multiple pieces of data measured respectively by the four ranging sensors 12-1, 12-2, 12-3, 12-4 illustrated in FIG. 5A are synthesized to generate one piece of ranging data.

Each ranging sensor 12-1, 12-2, 12-3, 12-4 includes its measurement range. In each measurement range, a ranging error becomes large in a peripheral portion. This is because, for example, since a TOF sensor uses an optical system lens as its measurement system, distortion in the peripheral portion increases in the same manner as an angle of view of a camera sensor. Accordingly, as illustrated in FIG. 8, the measurement accuracy in the peripheral portion is lower than that in the central portion.

For the reason above, it is not preferable to use the peripheral portion. Accordingly, each of the ranging sensors 12-1, 12-2, 12-3, 12-4 is arranged such that the measurement ranges of the adjacent ranging sensors overlap with each other in the orientation space so as to allow the portions with high measurement accuracy to be used preferentially. As a result, it is possible to realize ranging of the full solid angle with high accuracy. Since the positional relationships between the adjacent ranging sensors are known in advance, for example, at the time of layout thereof, a ranging territory of each ranging sensor may be predetermined for the selection above. The same procedure is applied to the remaining ranging sensors 12-5 to 12-8 illustrated in FIG. 7A to improve the accuracy of ranging of the full solid angle.

Figure 9:
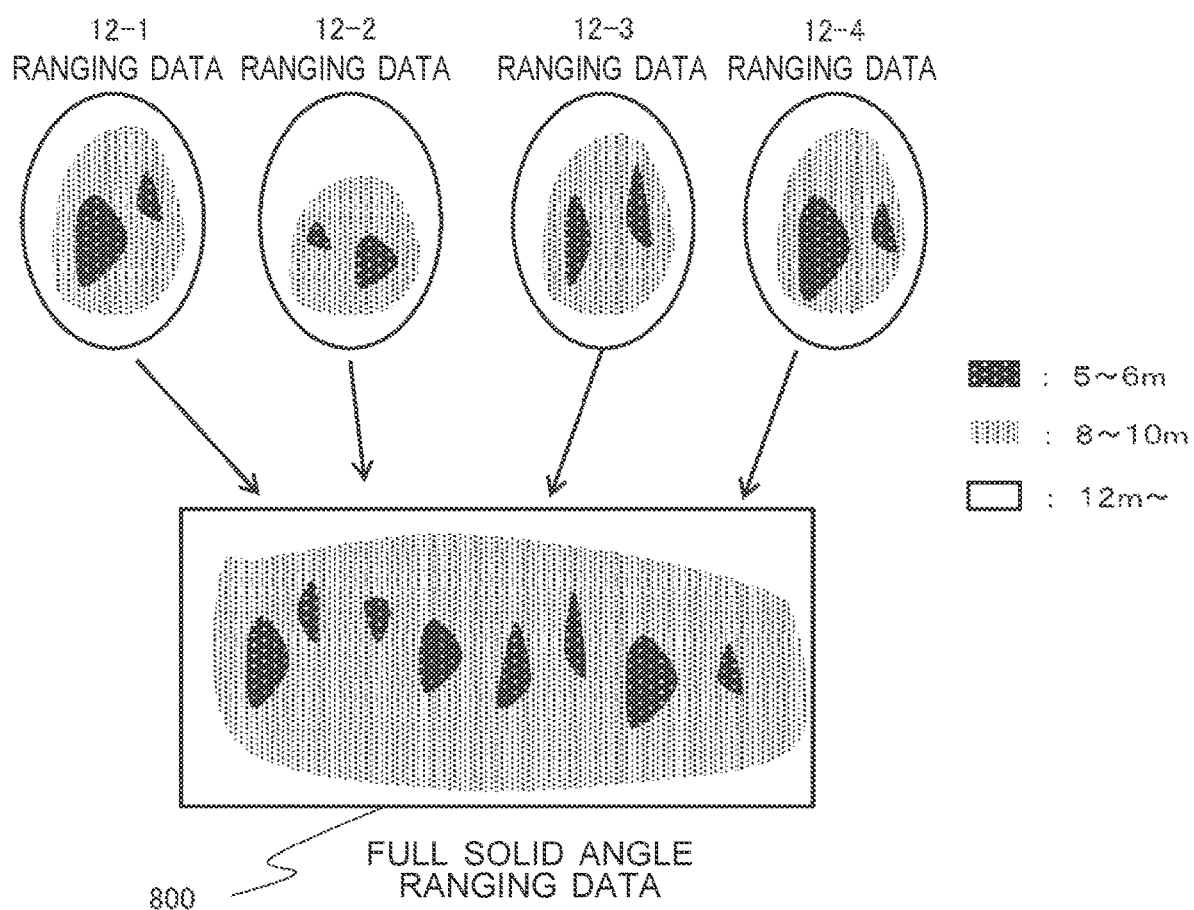
FIG. 9 illustrates full solid angle ranging data.

FIG. 9 illustrates an example of synthesizing multiple pieces of ranging data into one piece of ranging data. Although FIG. 9 illustrates the distance information by using three types of patterns, the present invention is not limited thereto. In practice, the distance is calculated more accurately with shading, or may be color-coded.

The CPU 16 may read the ranging data from each of the ranging sensors 12-1 to 12-4 and synthesizes and trims them to generate full solid angle ranging data 800. The ranging data synthesizing processing may be performed using only ranging data of each ranging sensor, or may be performed by complementing the ranging data using the imaging data obtained from the imaging devices. The details thereof will be described later.

At the time of synthesizing the ranging data, there is a possibility that deviation in the ranging data is generated at a connection portion of the measurement ranges. The deviation is generated because geometric focal points of lights incident on each ranging sensor does not necessarily coincide therewith, and thus an area of the orientation range covered by each ranging sensor is deviated depending on the distance to the measurement object. A data correction method in this case will be described with reference to FIG. 10.

Figure 10A:
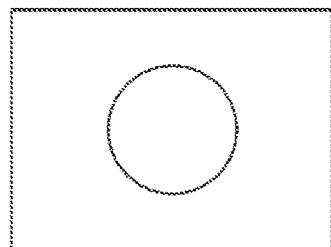
FIG. 10A illustrates an example of imaging data.
Figure 10B:
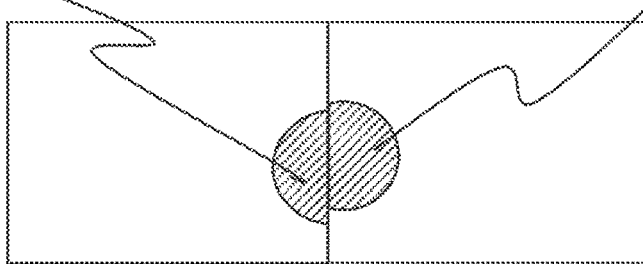
FIG. 10B illustrates an example of a ranging data synthesizing method.
Figure 10C:
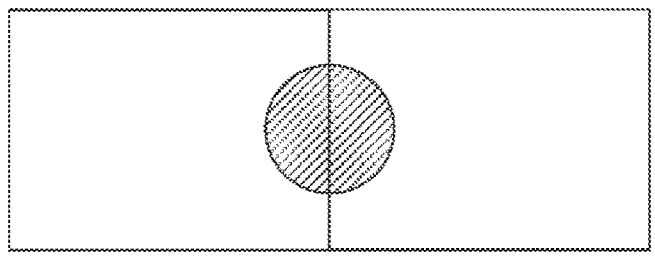
FIG. 10C illustrates an example of connecting and shaping areas.

The imaging data illustrated in FIG. 10A is based on the example of the imaging device 11-1 of FIG. 2. FIG. 10B illustrates a method of synthesizing two pieces of data of the ranging sensors 12-1, 12-2 that perform ranging of the range of the above-described imaging data. In the actual case, since four sets of the ranging sensors are arranged as proximity devices of the imaging device 11-1, four pieces of data are synthesized. However, in order to simplify the explanation, an example of synthesizing two pieces of data of two proximity devices will be described. Furthermore, in the actual case, portions other than the imaging range of the imaging device 11-1 exist in the measurement range of each of the two ranging sensors 12-1, 12-2. However, for the purpose of simplifying the explanation, measurement within the imaging range of the imaging device 11-1 will be described in the following. When it is assumed that the ranging sensors 12-1, 12-2 are arranged at geometrically accurate positions, angles, and directions, only the distortion in the peripheral portion needs correction. In this case, the ranging data may be synthesized by using the data with high accuracy in view of the measurement ranges and their positional relationship as illustrated in FIG. 8.

On the other hand, the ranging sensors are arranged on an actual product in a state of being deviated from the geometrically accurate positions. That is, there are cases where "focal points" (a point on which incident signals are geometrically converged) of each device are not aligned at one point, or pieces of data are not neatly connected with each other due to problems of distortion, mounting positions of the ranging sensors, or accuracy even when the angles of view overlap with each other. Accordingly, it is necessary to dynamically adjust the connection of data in accordance with the distance to the subject by using the imaging data. For example, as illustrated in FIG. 10B, a ranging data range obtained by measuring a certain target by means of the ranging sensors 12-1, 12-2 is slightly deviated due to deviation in the focal points and mounting accuracy. Accordingly, the ranging data is corrected to bring the deviation to match the above-described imaging data, and shaping of the connection between the areas (see FIG. 10C) is performed. The correction can be calculated based on the distance to the object and the property and arrangement of the device, meanwhile, when the shaping is further performed with reference to the imaging data, it is possible to improve the accuracy of the data in the boundary area.

According to the first embodiment, in the case of arranging a plurality of devices of multiple types on one base body 2, orientation groups having different symmetries included in the orientation defining polyhedron 5 are used so that the devices are arranged to form nesting structures in the orientation space. As a result, it is possible to efficiently arrange the devices of both the same type and different types on the base body 2 without interference between their center orientations, and realize the ranging of the full solid angle.

Second Embodiment

Figure 11A:
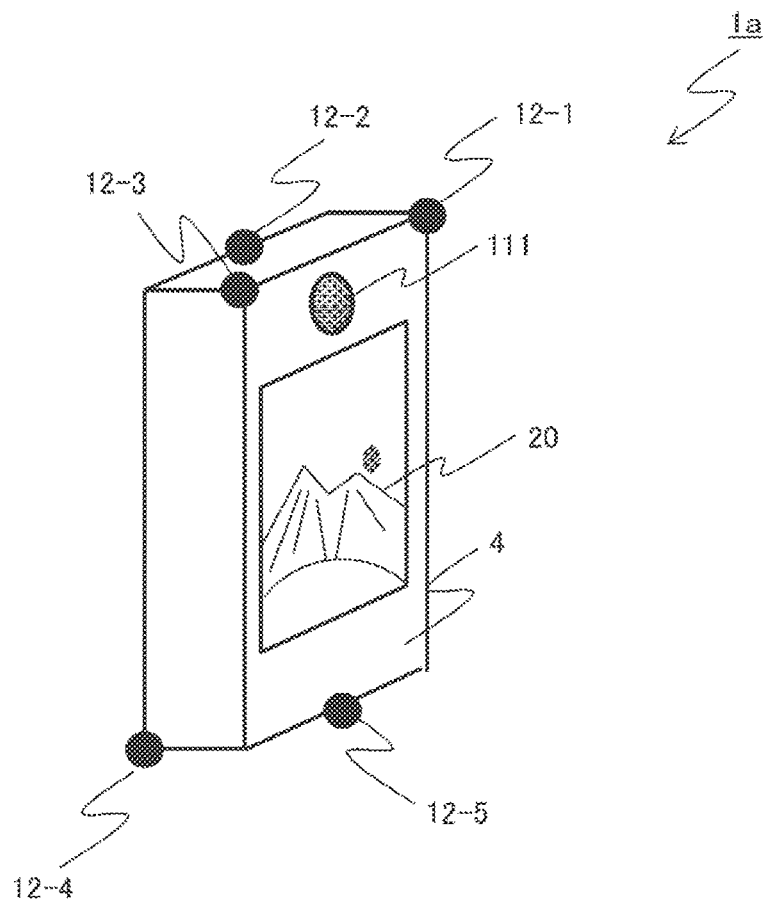
FIG. 11A illustrates an appearance of a composite reception and emission apparatus according to a second embodiment.
Figure 11B:
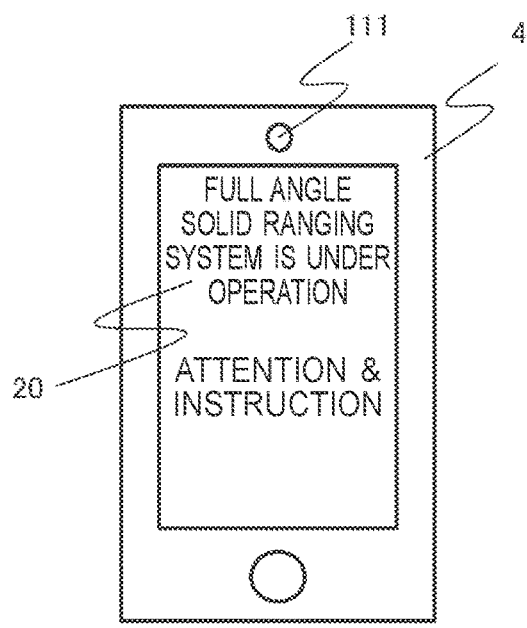
FIG. 11B illustrates a display example of the composite reception and emission apparatus according to the second embodiment.

A second embodiment is an embodiment in which a composite reception and emission apparatus 1a is applied to a portable information terminal 4. FIG. 11A illustrates an appearance of the composite reception and emission apparatus 1a according to the second embodiment. FIG. 11B illustrates a display example of the composite reception and emission apparatus 1a.

The composite reception and emission apparatus 1a includes, on the portable information terminal 4 as the base body 2, a display 20 for confirming a distance and image of an object or a person measured by the imaging devices and the ranging sensors. The configurations of the imaging devices and the ranging sensors are the same as those illustrated in FIG. 5B. FIG. 11A does not illustrate invisible portions.

As illustrated in FIG. 11B, the composite reception and emission apparatus 1a may display a character or the like to show that measurement is being performed. After ranging and imaging, the composite reception and emission apparatus 1a may display the captured image of the full solid angle and the distance information. By rotating the portable information terminal 4 in, for example, the up and down and left and right directions, a full solid angle image is displayed on the display 20. At this time, the composite reception and emission apparatus 1a cooperates with a gyro sensor of the portable information terminal (see FIG. 12) to confirm the orientation of the portable information terminal 4, and displays an image corresponding thereto.

Figure 12:
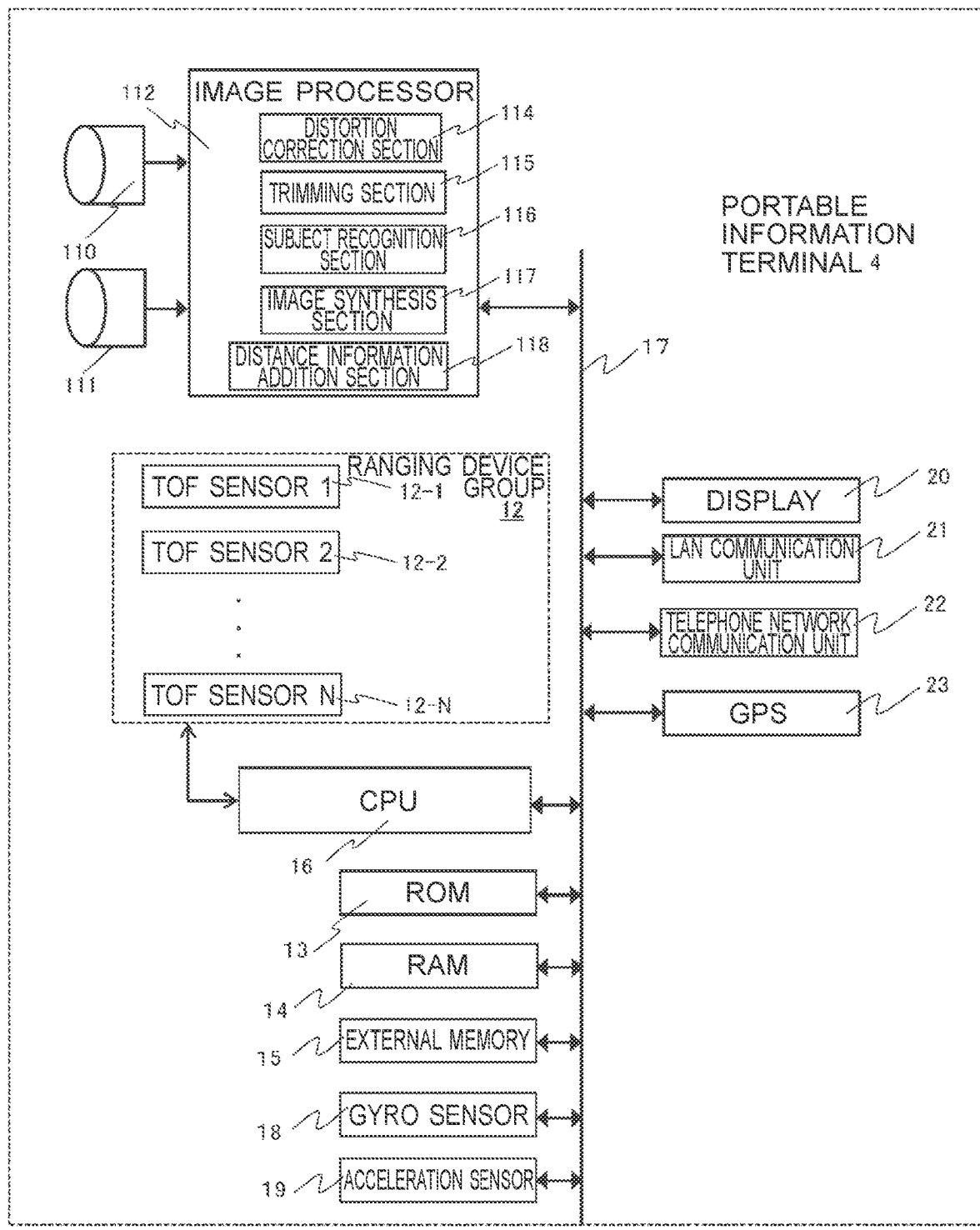
FIG. 12 illustrates entire blocks of the composite reception and emission apparatus according to the second embodiment.

FIG. 12 illustrates entire blocks of the composite reception and emission apparatus 1a.

The portable information terminal 4 includes a camera 110 having a wide-angle lens and an imaging element (for example, a CCD sensor or a CMOS sensor), which serves as the first-type device, an in-camera 111 having a wide-angle lens and an imaging element as well, whose imaging range covers the display 20 side, an image processor 112 configured to perform image processing based on the image data obtained from each of the camera 110 and the in-camera 111, the N number of TOF sensors 1, 2, . . . , N (12-1), (12-2), . . . , 12-N) which serve as the second-type devices, a ROM 13, a RAM 14, an external memory 15, a CPU 16, a system bus 17, a gyro sensor 18, an acceleration sensor 19, the display 20, a LAN communication unit 21, a telephone network communication unit 22, and a Global Positioning System (GPS) 23.

The image processor 112 includes a distortion correction section 114 configured to correct an image that is distorted from the captured image due to angle correction, rotation correction, or a wide-angle lens so that it appears to be the original state, a subject recognition section 116 configured to recognize the face of a person or an object, a trimming section 115 configured to cuts out a portion of the face of the person or the object from the image data base on the subject recognition section 116, and an image synthesis section 117 configured to synthesize the images captured by the plurality of cameras.

The second embodiment includes at least two cameras. In the above-described example, two cameras such as the in-camera and the normal camera each having a wide-angle lens whose angle of view is at least 180 degrees or more are provided, and each of the cameras is mounted on each different face, thereby making it possible to take an image of the full solid angle. The number of cameras to be mounted is not limited thereto as long as being two or more.

In the image processor 112, firstly, the distortion correction section 114 performs distortion correction on the image data acquired from either the camera 110 or the in-camera 111, and after the subject recognition section 116 recognizes a person or an object, the trimming section 115 trims the person or the object. Meanwhile, the distortion correction is not limited thereto, and it may be configured to perform distortion correction with high accuracy after simply correcting the distortion generated due to a super wide angle lens, or display, on the display 20, a detailed distance to the person or the object obtained from the ranging sensor group 12, which will be described later.

Figure 13:
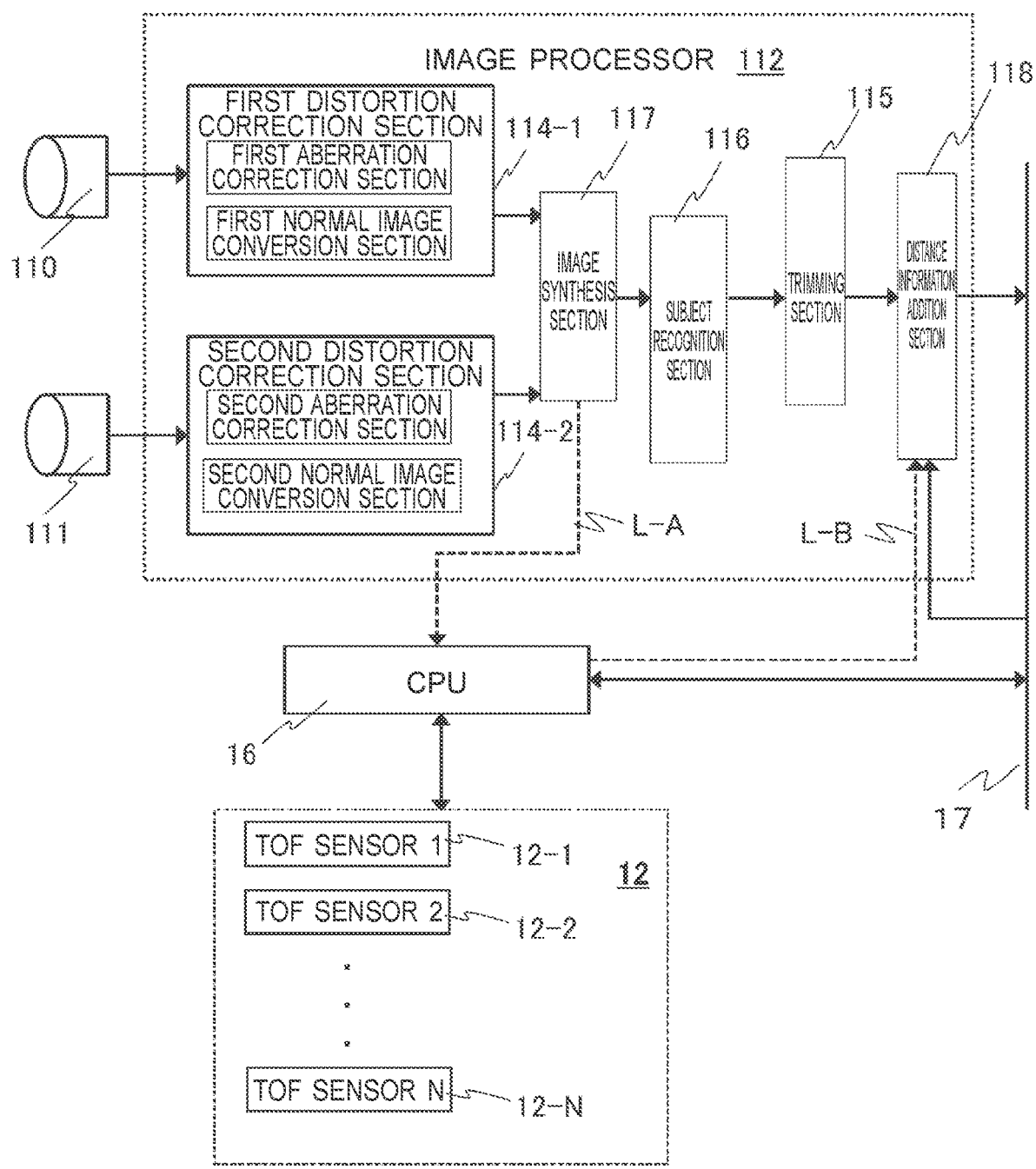
FIG. 13 illustrates an algorithm of full solid angle imaging and ranging performed by an image processor.

FIG. 13 illustrates an algorithm of the full solid angle imaging and ranging performed by the image processor 112.

The image processor 112 includes a first distortion correction section 114-1 configured to receive the imaging data from the camera 110 and correct the distortion due to the wide-angle lens, and a second distortion correction section 114-2 configured to receive the imaging data from the in-camera 111 and correct the distortion due to the wide-angle lens. The first distortion correction section 114-1 includes a first aberration correction section and a first normal image conversion section. Similarly, the second distortion correction section 114-2 includes a second aberration correction section and a second normal image conversion section. In the example above, one distortion processing unit is provided for one camera. Meanwhile, the present invention is not limited thereto, and one processing function may perform the processing while switching if it can perform high-speed processing and there is no time constraint.

Each of the first distortion correction section 114-1 and the second distortion correction section 114-2 outputs, to the image synthesis section 117, the image after the distortion correction processing. The image synthesis section 117 synthesizes the image after the distortion correction acquired from the first distortion correction section 114-1 and the image after the distortion correction acquired from the second distortion correction section 114-2 so as to create an image of the full solid angle (hereinafter referred to as "full solid angle image"), and outputs the created image to the subject recognition section 116.

The subject recognition section 116 performs subject recognition processing based on the full solid angle image, and outputs a result thereof to the trimming section 115.

The trimming section 115 trims, in the full solid angle image, the image area of the subject recognized in the subject recognition processing. The trimming section 115 may completely trim the subject area to extract only the subject area, or perform processing of adding a frame that encloses a frame of the subject area. The trimmed image may be further subjected to the distortion correction, or a distance thereto may be displayed by enlarging or emphasizing the trimmed portion, which will be described later.

On the other hand, the CPU 16 acquires the ranging data of each of the TOF sensors 12-1, 12-2, . . . , 12-n and synthesizes them into the full solid angle ranging data. The CPU 16 complements a plurality of pieces of ranging data measured by the angle of view of the ranging sensors with each other to create the full solid angle ranging data 800 (see FIG. 8 and FIG. 9).

The CPU 16 acquires the full solid angle image from the image synthesis section 117 (L-A in FIG. 13), and makes it associated with the full solid angle ranging data 800. There are various kinds of methods for this processing. For example, a subject is placed in advance on a known position around the composite reception and emission apparatus 1a to create the full solid angle image, while a distance from the composite reception and emission apparatus 1a to the subject above is measured by using the ranging sensor group 12 to create the full solid angle ranging data 800. Then, the subject area in the full solid angle image in which the subject above is captured is made associated with the distance information to the subject above read from the full solid angle ranging data 800 to create calibration data in which the imaging area in the full solid angle image and the distance information to the subject captured in the imaging area are associated with each other.

When the user uses the composite reception and emission apparatus 1a, the CPU 16 creates the full solid angle image, refers to the calibration data, and reads the distance information corresponding to the imaging area in the full solid angle image. The CPU 16 outputs the read distance information and the corresponding position of the imaging area in the full solid angle image (for example, coordinates in the full solid angle image) to a distance information addition section 118.

The distance information addition section 118 adds the distance information acquired from the CPU 16 to the subject area in the full solid angle image based on the information of the subject area acquired from the trimming section 115.

Figure 14:
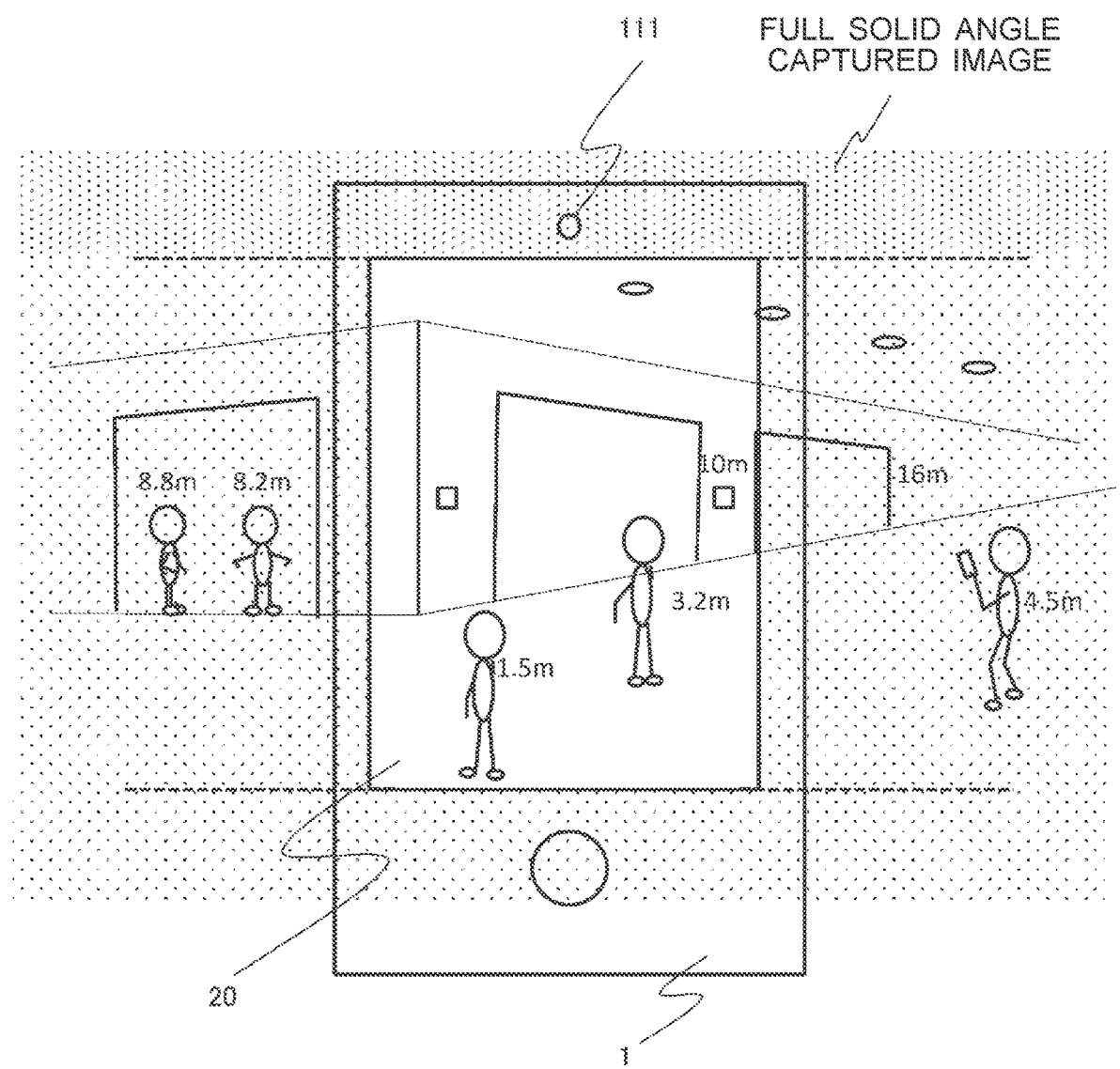
FIG. 14 illustrates an example in which distance information is added and displayed in a full solid angle image.

FIG. 14 illustrates an example in which the distance information is added and displayed in the full solid angle image. In FIG. 14, a display range of the display 20 displays a part of the full solid angle. The full solid angle may be displayed by rotating the position of the display 20 in the up and down and left and right directions based on the data of the gyro sensor 18, or scrolling the display 20 in the back and forth and left and right directions. Furthermore, as illustrated in FIG. 14, the distance information may be displayed for a specific object.

Figure 15:
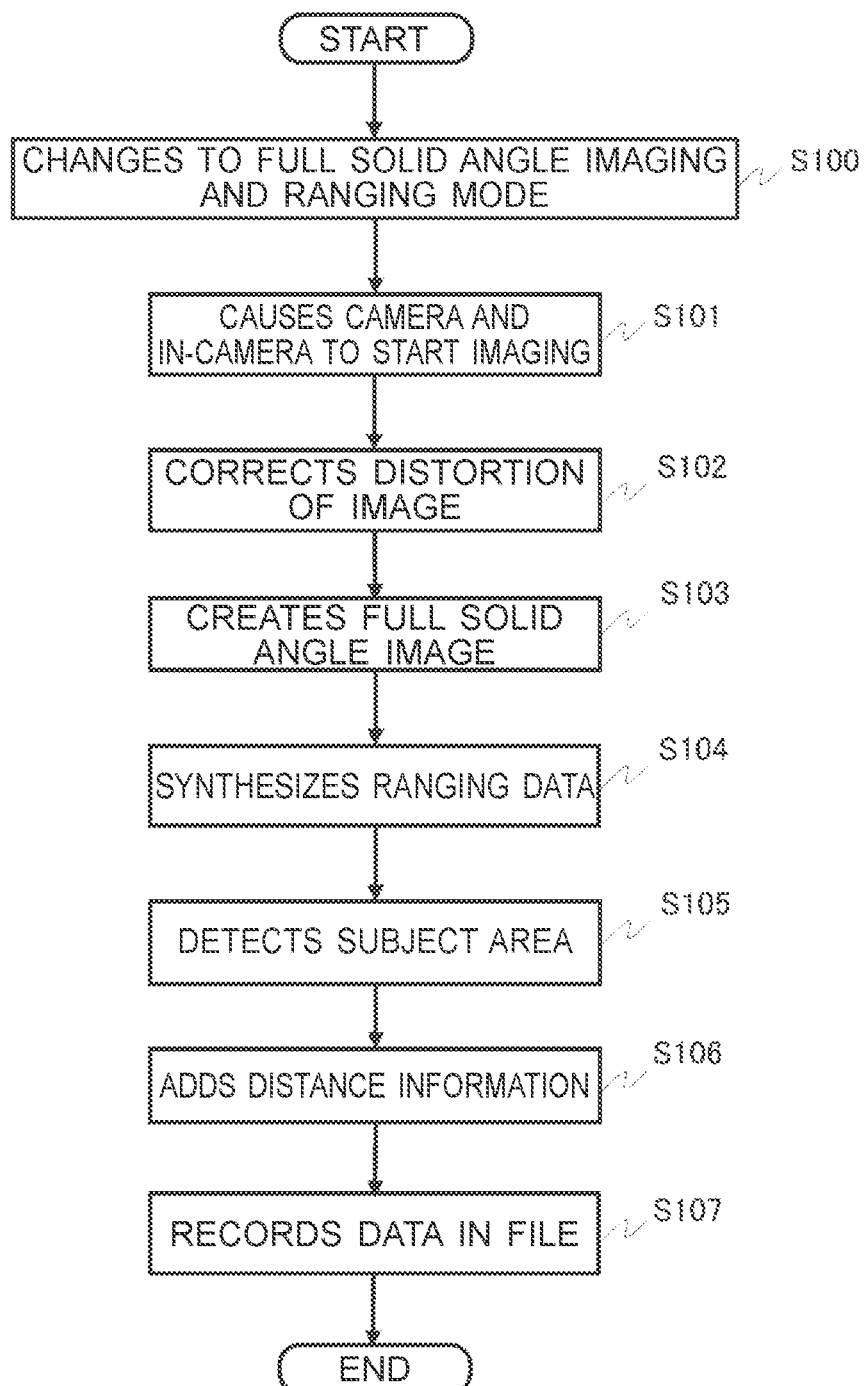
FIG. 15 illustrates a flowchart of creating processing of a full solid angle image and full solid angle ranging data.

FIG. 15 illustrates a flowchart of processing of creating the full solid angle image and the full solid angle ranging data 800 in the composite reception and emission apparatus 1a. The flow of the processing described below is the same as that of the composite reception and emission apparatus 1 described in the first embodiment.

The user of the composite reception and emission apparatus 1a who wishes to perform imaging and ranging of the full solid angle switches an operation mode of the composite reception and emission apparatus 1a to a full solid angle imaging and ranging mode (step S100). The composite reception and emission apparatus 1a displays a mode selection screen on the display 20 to receive a mode selection operation from the user. The composite reception and emission apparatus 1a may be configured to, when the operation mode is switched to the full solid angle imaging and ranging mode, cause the display 20 to display, for example, "full solid angle imaging and ranging system is under operation" in order to urge the user to pay attention, for example, not to shake the apparatus as much as possible.

Each of the camera 110 and the in-camera 111 is activated to start capturing an image. Furthermore, each of the ranging sensors 12-1, 12-2, . . . , 12-N is activated to start ranging (step S101).

The image data generated by each of the camera 110 and the in-camera 111 is output to the image processor 112. The image processor 112 corrects the distortion caused by the wide-angle lens (step S102), and creates a full solid angle image (step S103).

The CPU 16 (second-type device processor 212 in the first embodiment) synthesizes the ranging data measured by the ranging sensors 12-1, 12-2, . . . , 12-N to create the full solid angle ranging data 800 (step S104). Step S103 and step S104 may be executed simultaneously, or step S104 may be executed firstly.

The image processor 112 detects a subject area from the full solid angle image (step S105), and performs the trimming processing thereon to cut out the subject area. Then, the image processor 112 adds the distance information from the composite reception and emission apparatus 1a to the subject by using the full solid angle ranging data 800 created in step S104 (S106).

The image processor 112 records the full solid angle image to which the distance information has been added and the full solid angle ranging data in at least one of the RAM 14 and the external memory 15 (step S107), and ends the processing.

Figure 16:
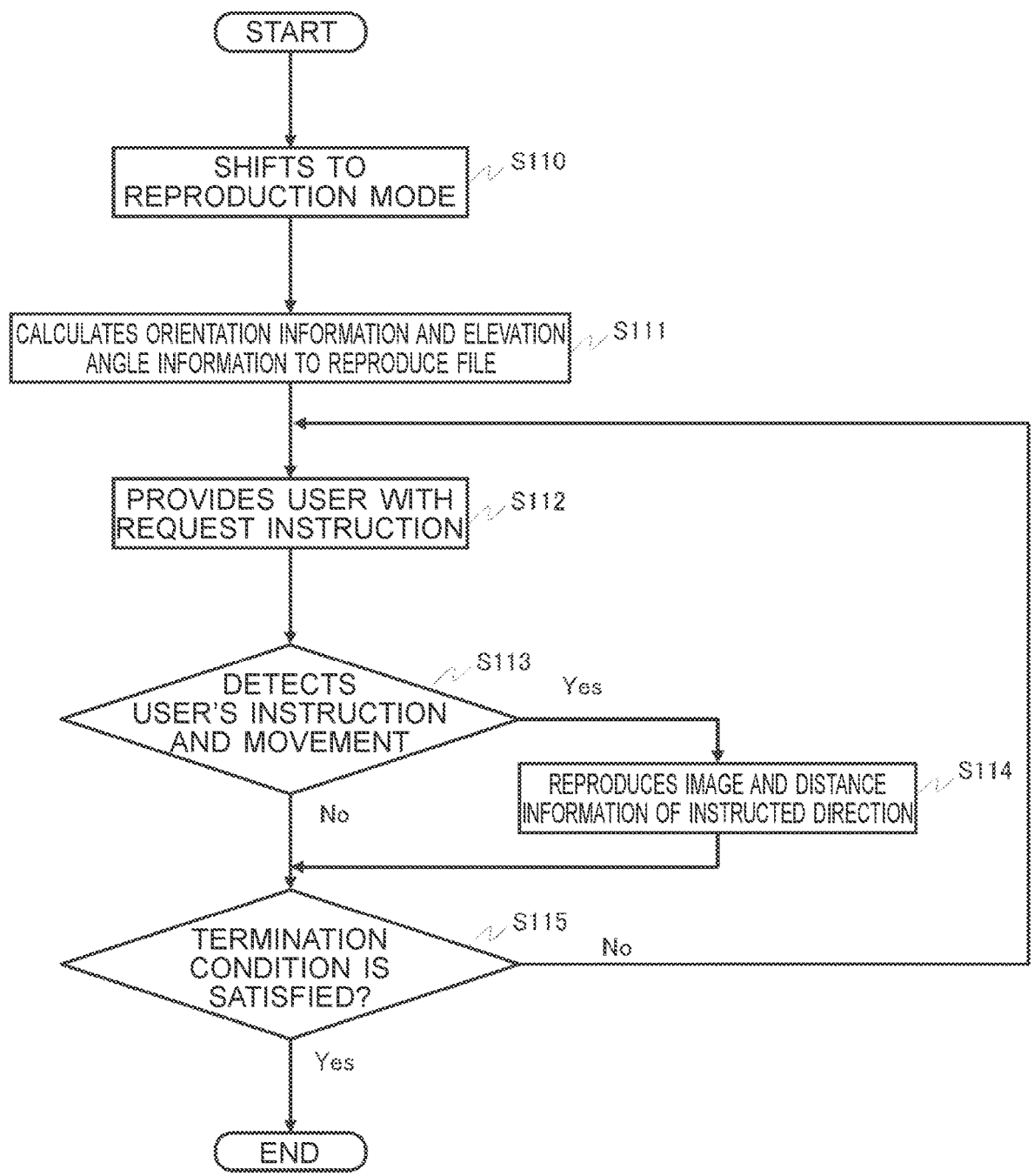
FIG. 16 illustrates a flowchart of reproduction processing of a full solid angle image and full solid angle ranging data.

FIG. 16 illustrates a flowchart of reproduction processing of the full solid angle image and the full solid angle ranging data 800 in the composite reception and emission apparatus 1a. The flow of the processing described below is the same as that of the composite reception and emission apparatus 1 described in the first embodiment.

The composite reception and emission apparatus 1a performs an operation for shifting to a reproduction mode of the full solid angle image and the full solid angle ranging data (step S110). The composite reception and emission apparatus 1a displays a mode selection screen on the display 20 to receive a mode selection operation from the user. Furthermore, the composite reception and emission apparatus 1a receives an operation for selecting a file to be reproduced out of the data recorded in the RAM 14 or the external memory 15 from the user, and reproduces the file (step S111).

The file to be reproduced includes the image information and the distance information of a range wider than the display 20, that is, the image information and the distance information of the full solid angle (see FIG. 14). Accordingly, the composite reception and emission apparatus 1a calculates the orientation information and the elevation information in the horizontal plane based on the position information from the gyro sensor 18, the acceleration sensor 19, and the GPS 23 to display the image of a particular orientation in the full solid angle image (partial image of the full solid angle image) and the distance information.

Thereafter, the composite reception and emission apparatus 1a requests the user to scroll the display 20 or move the composite reception and emission apparatus 1a (step S112).

When detecting the movement of the user (for example, scrolling or moving the composite reception and emission apparatus 1a) (step S113/Yes), the composite reception and emission apparatus 1a displays an image and the distance information of the instructed direction (step S114).

When not detecting the movement of the user (step S113/No) nor a termination condition in which, for example, any instruction or movement of the user is absent for a predetermined period after step S114, or when receiving an operation for terminating the reproduction (step S115/Yes), the composite reception and emission apparatus 1a terminates the reproduction processing. When the termination condition is not satisfied (step S115/No), the processing returns to step S112.

Figure 17A:
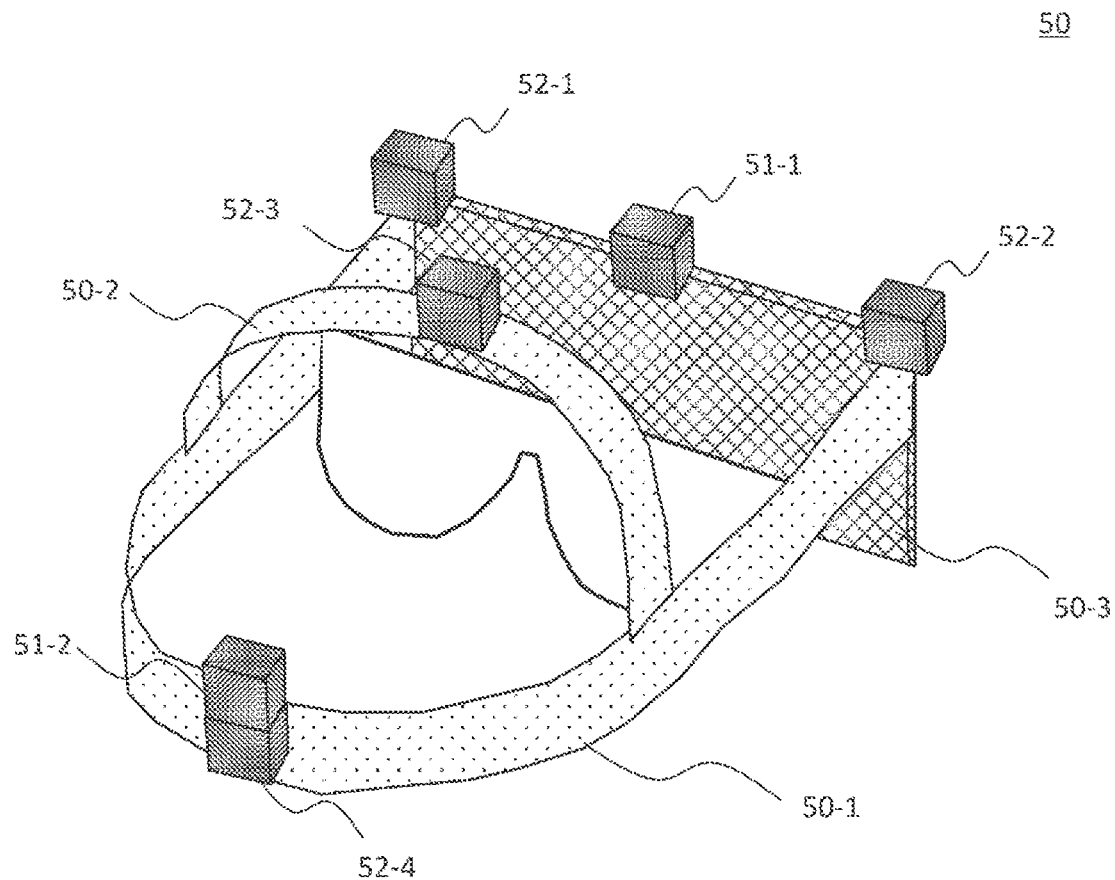
FIG. 17A illustrates an example in which a composite reception and emission apparatus 1 is applied to an HMD.

FIG. 17A illustrates an example in which the composite reception and emission apparatus 1 is applied to a Head Mounted Display (HMD) 50.

At the time of displaying Augmented Reality (AR) by using the HMD, imaging data and ranging data obtained by performing imaging and ranging in the real surrounding environment of an HMD user may be used. As a result, it is possible to improve the control accuracy in superimposing and displaying a virtual object on the real space.

Figure 17B:
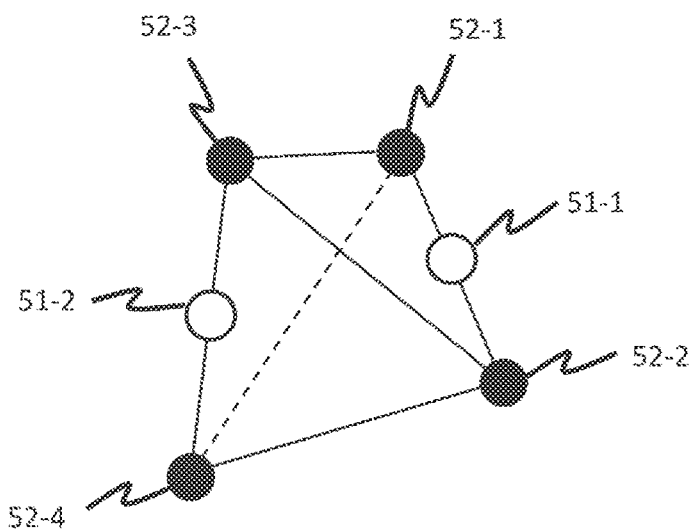
FIG. 17B illustrates an example of a device arrangement on an HMD.

As illustrated in FIG. 17A, an HMD 50 includes a side head attachment 50-1, a top head attachment 50-2, and a transmission or non-transmission type display 50-3. The HMD 50 is provided with a first camera 51-1 having a wide-angle lens on the center of the upper side of the display 50-3, and a second camera 51-2 having a wide-angle lens on the center of the rear head part of the side head attachment 50-1. The HMD 50 is also provided with a first ranging sensor 52-1 and a second ranging sensor 52-2 on each of the left and right vertexes of the display 50-3, respectively. In addition, the HMD 50 is provided with a third ranging sensor 52-3 on the top head prat of the top head attachment 50-2, and a fourth ranging sensor 52-4 on the center of the rear head part of the side head attachment 50-1. That is, as illustrated in FIG. 17B, the present example of the HMD 50 uses a regular tetrahedron as the orientation defining polyhedron 5. Each of the cameras has an angle of view of 180 degrees or more, and is arranged on two opposing orientations (51-1, 51-2), respectively, of the edge center orientation group while each of the ranging sensors is arranged in each of the vertex center orientations.

Figure 18A:
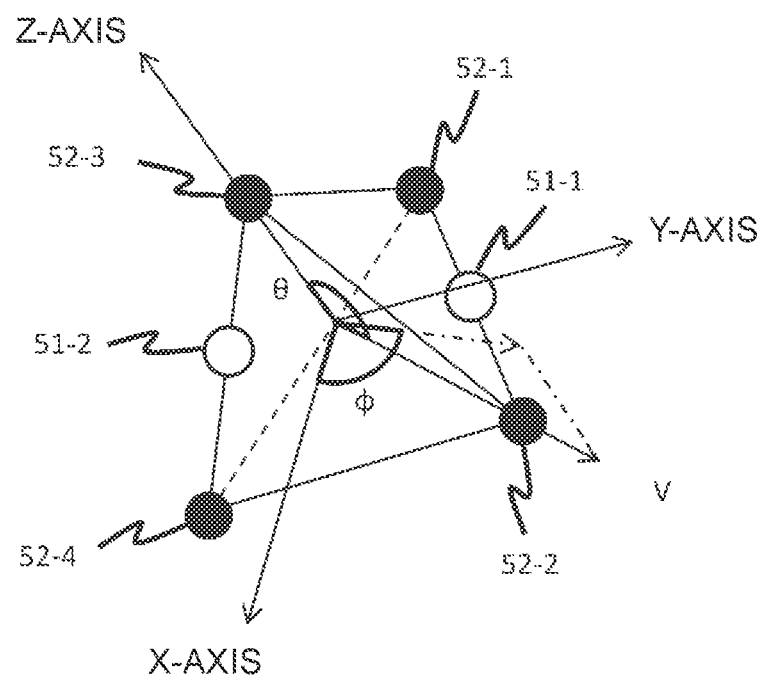
FIG. 18A illustrates a required reception and emission angle range of each device arranged on an HMD.
Figure 18B:
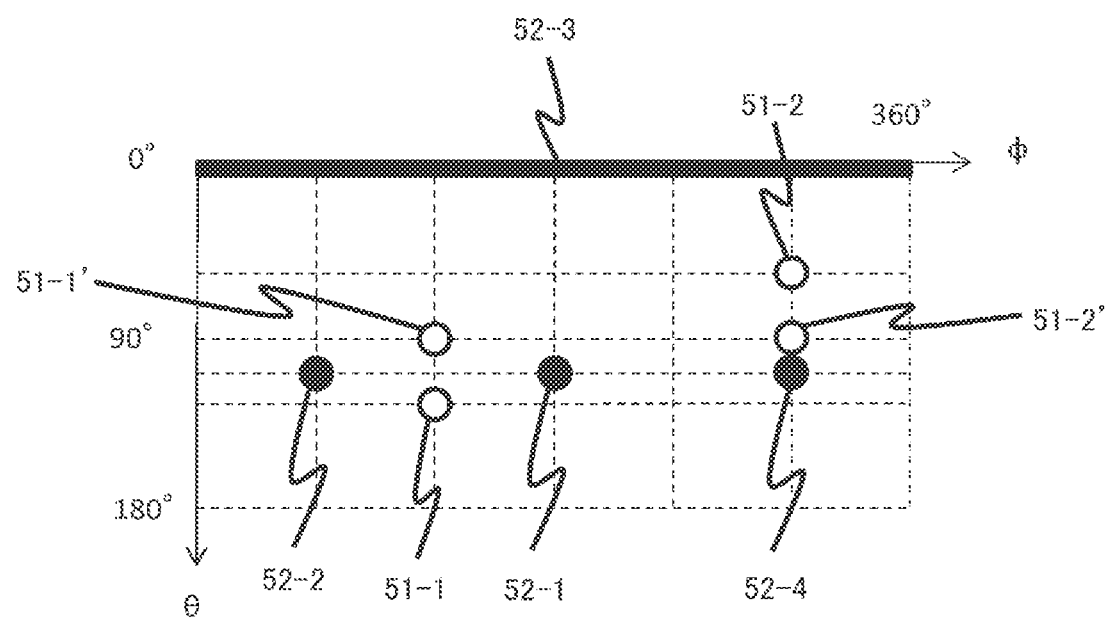
FIG. 18B illustrates each orientation to which each of all devices is directed by using a polar coordinate system.

In the case of creating a full solid angle image and full solid angle ranging data in the HMD 50, it is desirable to place the connection portion in the full solid angle image directly below the HMD 50, in other words, on the side of the wearer of the HMD 50. This is because the wearer of the HMD 50 mostly does not need his or her own image. This is also the case of the ranging data. Since the wearer of the HMD 50 rarely needs to know the distance to himself or herself, it is desirable to place the connection portion in the ranging data on the side of the wearer of the HMD 50. In this connection, FIG. 18A and FIG. 18B illustrate a modification of a sensor arrangement. In this modification, since an orientation of each camera is deviated from the edge center orientation while ensuring the required reception and emission angle range with an adjacent sensor, an orientation of each sensor is adjusted so that each connection portion in the imaging data and the ranging data is placed directly below the HMD 50. FIG. 18B illustrates orientations to which devices are directed in the orientation space. In FIG. 18B, orientations of devices 51-1, 51-2 arranged in the edge center orientations are adjusted. When the positive direction of the Z-axis is selected in the vertically upper direction, the user's body is in the negative direction of the Z-axis and the optical axis of the camera is in the horizontal direction. As a result, each connection portion in both the imaging data and the ranging data is placed on the side of the wearer of the HMD 50. In this modification as well, devices closest to each device in the orientation space are the different type devices.

According to the present embodiment, it is possible to arrange devices of different types on a small portable information terminal such as a smart phone such that the arrangement positions of the devices of both different types and the same type do not overlap with each other, as well as the measurement ranges thereof include the full solid angle.

The embodiment described above is a merely example of an embodiment of the present invention, and the present invention is not limited thereto. For example, as one of the modifications, the present invention may be used for a video conference system. When distance information and object recognition of a full solid angle is used in the video conference system, a position of each person attending a conference can be recognized based on face recognition images and the distance information of all attendees. As a result, it is possible to specify a person who is speaking, and enlarge and display the speaking person by a combination with a directional microphone, or specify the content of conversation and the attendees, and record the conversation clearly.

A transmission antenna and a reception antenna of radio waves are included in the examples of the reception device and the emission device. Since the frequency used in a cell phone becomes high and the directivity thereof becomes strong, it is necessary to efficiently arrange antennas so as to cover a full solid angle as reception and emission ranges of the radio waves. The present invention is also effective in this case.

Furthermore, a microphone and a speaker, each having a strong directivity, are included in the examples of the reception device and the emission device. The present invention is also effective in an audio input and output device such as a smart speaker so as to realize sound exchange for a specific user targeted from among users existing nearby.

Each of the hardware configuration of the composite reception and emission apparatus 1 and that of the composite reception and emission apparatus 1a is merely an example. A single set of the CPU 16 may perform each function of the first-type device processor 211, the second-type device processor 212, and the image processor 112.

REFERENCE SIGNS LIST 1, 1a: composite reception and emission apparatus
2: base body
3: controller
4: portable information terminal
5: orientation defining polyhedron
11: first-type device group
12: second-type device group
13: ROM
14: RAM
15: external memory
16: CPU
17: system bus
18: gyro sensor
19: acceleration sensor
20: display
21: LAN communication unit
22: telephone network communication unit
23: GPS
50: HMD
50-1: side head attachment
50-2: top head attachment
50-3: display
51-1: first camera
51-2: second camera
52-1: first ranging sensor
52-2: second ranging sensor
52-3: third ranging sensor
52-4: fourth ranging sensor
110: camera
111: in-camera
112: image processor
114: distortion correction section
114-1: correction section
114-2: correction section
115: trimming section
116: subject recognition section
117: image synthesis section
118: distance information addition section
211: first-type device processor
212: second-type device processor
800: full solid angle ranging data

The invention claimed is:

1. A composite reception and emission apparatus, comprising:
  a plurality of first-type devices that receives or emits energy;
  a plurality of second-type devices that receives or emits energy, whose type is a different from a type of the first-type devices; and
  a base body on which the plurality of first-type devices and the plurality of second-type devices are mounted,
  when a reception direction or an emission direction of each of the plurality of first-type devices is combined with each other for each of the plurality of first-type devices, each of the plurality of first-type devices receiving the energy from an area of a full solid angle or emitting the energy toward the area of the full solid angle,
  when a reception direction or an emission direction of each of the plurality of second-type devices is combined with each other for each of the plurality of second-type devices, each of the plurality of second-type devices receiving the energy from the area of the full solid angle or emitting the energy toward the area of the full solid angle, and
  the plurality of first-type devices and the plurality of second-type devices being arranged on the base body so as to satisfy both of two constraint conditions below:
  Constraint condition 1: A device closest to each of the plurality of first-type devices in an orientation space is at least one of the second-type devices; and
  Constraint condition 2: A device closest to each of the plurality of second-type devices in the orientation space is at least one of the first-type devices.

2. A composite reception and emission apparatus, comprising:
- at least three first-type devices that receive or emit energy;
- at least two second-type devices that receive or emit energy, whose type is a different from a type of the first-type devices and which are less in number than the first-type devices; and
- a base body on which the first-type devices and the second-type devices are mounted,
- when all the energy received by each of the first-type devices are combined, the first-type devices receiving the energy from an area of a full solid angle, or when all the energy emitted from each of the first-type devices are combined, the first-type devices emitting the energy toward the area of the full solid angle, and
- when all the energy received by each of the second-type devices are combined, the second-type devices receiving the energy from the area of the full solid angle, or when all the energy emitted from each of the second-type devices are combined, the second-type devices emitting the energy toward the area of the full solid angle.

3. The composite reception and emission apparatus according to claim 1, wherein
- an orientation defining polyhedron is defined,
- the orientation defining polyhedron has a shape including a first symmetry with one point in the orientation defining polyhedron as a reference point, and a second symmetry different from the first symmetry,
- each of the plurality of first-type devices is arranged in an orientation satisfying the first symmetry included in the orientation defining polyhedron, and
- each of the plurality of second-type devices is arranged in an orientation satisfying the second symmetry included in the orientation defining polyhedron.

4. The composite reception and emission apparatus according to claim 3, wherein
- the orientation defining polyhedron is a regular polyhedron, a semi-regular polyhedron, or a Catalan solid.

5. The composite reception and emission apparatus according to claim 3, wherein
- each of the first symmetry and the second symmetry is one of an orientation group directed from the reference point toward a face center or a center of gravity of the orientation defining polyhedron, an orientation group directed from the reference point toward an edge center orientation of the base body, or an orientation group directed from the reference point toward a vertex orientation of the base body.

6. The composite reception and emission apparatus according to claim 1, wherein
- each of the plurality of first-type devices is a reception device and each of the plurality of second-type devices is an emission device, or each of the plurality of first-type devices is the emission device and each of the plurality of second-type devices is the reception device, and
- each of the plurality of first-type devices and the plurality of second-type devices is arranged on the base body in an orientation and a position on which the reception device does not directly receive the energy emitted from the emission device.

7. The composite reception and emission apparatus according to claim 1, wherein
- the base body is a portable information terminal.

8. The composite reception and emission apparatus according to claim 1, further comprising a processor configured to synthesize information measured by the plurality of first-type devices to generate information of the full solid angle, and synthesize information measured by the plurality of second-type devices to generate information of the full solid angle.

9. The composite reception and emission apparatus according to claim 1, wherein
- either the first-type devices or the second-type devices are imaging devices, and the others are ranging sensors.

10. The composite reception and emission apparatus according to claim 9, further comprising a processor configured to perform synthesize by using imaging data measured by the imaging devices and ranging data measured by the ranging sensors so as to display image information of the full solid angle.

11. The composite reception and emission apparatus according to claim 10, wherein
- the processor is further configured to, when synthesizing the ranging data as ranging information of the full solid angle, extract, for each measurement range of the ranging sensors, the ranging data obtained from orientation angles measured with high accuracy, and synthesize the ranging data as extracted.

* * * * *